United States Patent
Yoshida et al.

(10) Patent No.: US 12,442,773 B2
(45) Date of Patent: Oct. 14, 2025

(54) CRACK DETECTION DEVICE, CRACK DETECTION METHOD AND COMPUTER READABLE MEDIUM

(71) Applicant: Mitsubishi Electric Corporation, Tokyo (JP)

(72) Inventors: Mitsunobu Yoshida, Tokyo (JP); Tadashiro Kondo, Tokyo (JP); Taichi Ishifuji, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 420 days.

(21) Appl. No.: 17/793,947

(22) PCT Filed: Mar. 4, 2020

(86) PCT No.: PCT/JP2020/009246
§ 371 (c)(1),
(2) Date: Jul. 20, 2022

(87) PCT Pub. No.: WO2021/176613
PCT Pub. Date: Sep. 10, 2021

(65) Prior Publication Data
US 2023/0051683 A1 Feb. 16, 2023

(51) Int. Cl.
*G06K 9/00* (2022.01)
*G01N 21/88* (2006.01)
*G06T 7/00* (2017.01)

(52) U.S. Cl.
CPC ....... *G01N 21/8851* (2013.01); *G06T 7/0002* (2013.01); *G01N 2021/8896* (2013.01);
(Continued)

(58) Field of Classification Search
CPC ........ G01N 21/8851; G01N 2021/8896; G06T 7/0002; G06T 2207/10016; G06T 2207/20024; G06T 2207/30252
See application file for complete search history.

(56) References Cited

U.S. PATENT DOCUMENTS 9,710,899 B2 * 7/2017 Seki ................... G06T 3/047
11,157,750 B2 * 10/2021 Yamazaki ............ G06V 20/56
(Continued)

FOREIGN PATENT DOCUMENTS

| JP | 2016-218762 A | 12/2016 |
| JP | 2018-21375 A | 2/2018 |

(Continued)

OTHER PUBLICATIONS

International Search Report and Written Opinion mailed on Jun. 2, 2020, received for PCT Application PCT/JP2020/009246, filed on Mar. 4, 2020, 8 pages including English Translation.
(Continued)

*Primary Examiner* — Avinash Yentrapati
(74) *Attorney, Agent, or Firm* — XSENSUS LLP

(57) ABSTRACT

In a crack detection device (10), an image acquisition unit (21) acquires image data acquired by taking an image of a road surface from an oblique direction with respect to the road surface. An image classification unit (22) classifies image data acquired into an acceptable range with a resolution higher than a standard value, and an unacceptable range with a resolution equal to or less than the standard value. A data output unit (23) outputs acceptable data being image data of a part classified into the acceptable range as data to detect a crack on the road surface. An image display unit (24) displays data output.

13 Claims, 23 Drawing Sheets

(52) U.S. Cl.
CPC ............... *G06T 2207/10016* (2013.01); *G06T 2207/20024* (2013.01); *G06T 2207/30252* (2013.01)

(56) References Cited

U.S. PATENT DOCUMENTS

| | | | | |
|---|---|---|---|---|
| 11,295,426 | B2* | 4/2022 | Horita | G06T 7/262 |
| 11,566,902 | B2* | 1/2023 | Zavodny | G06F 16/29 |
| 11,645,735 | B2* | 5/2023 | Liu | G06T 5/20 |
| | | | | 382/155 |
| 11,681,047 | B2* | 6/2023 | Kagan | G01S 17/894 |
| | | | | 382/104 |
| 11,755,758 | B1* | 9/2023 | Southwood | G06V 30/19073 |
| | | | | 382/170 |
| 2011/0200270 | A1* | 8/2011 | Kameyama | G06T 1/00 |
| | | | | 382/300 |
| 2016/0189357 | A1* | 6/2016 | Shibata | G06V 10/30 |
| | | | | 382/197 |
| 2016/0342848 | A1* | 11/2016 | Seki | G06T 3/00 |
| 2018/0195973 | A1 | 7/2018 | Yonekawa et al. | |
| 2019/0163994 | A1 | 5/2019 | Yonekawa et al. | |
| 2019/0325595 | A1* | 10/2019 | Stein | G06V 10/82 |
| 2021/0365701 | A1* | 11/2021 | Eshet | B60W 30/181 |
| 2023/0169774 | A1* | 6/2023 | Guibene | G06V 30/18105 |
| | | | | 382/167 |
| 2023/0316556 | A1* | 10/2023 | Ramachandrula | G06V 10/751 |
| | | | | 382/203 |

FOREIGN PATENT DOCUMENTS

| | | |
|---|---|---|
| JP | 2018-87484 A | 6/2018 |
| JP | 2019-100136 A | 6/2019 |
| JP | 2019-101499 A | 6/2019 |
| WO | 2017/014288 A1 | 1/2017 |

OTHER PUBLICATIONS

Japanese Office Action issued Oct. 4, 2022 in Japanese Patent Application No. 2022-504856 (with machine-generated English translation), 6 pages.

* cited by examiner

CRACK DETECTION DEVICE, CRACK DETECTION METHOD AND COMPUTER READABLE MEDIUM

CROSS-REFERENCE TO RELATED APPLICATION

The present application is based on PCT filing PCT/JP2020/009246, filed Mar. 4, 2020, the entire contents of which are incorporated herein by reference.

TECHNICAL FIELD

The present invention relates to a technique to detect cracks on a road surface from image data acquired by taking an image of the road surface.

BACKGROUND ART

Soundness of a road, surface is measured based on a rutting, a crack and smoothness on a surface of a road. The crack among the rutting, the crack and the smoothness is detected by sight or by a computer from image data of the road surface. Then, for example, soundness of the road surface is determined by the number of cracks in a definite range.

The image data of the road surface is obtained by taking images with a camera mounted on a vehicle while making a vehicle travel.

The image data used at the time of detecting cracks is an ortho image obtained by taking an image of the road surface from straight above. In order to obtain an ortho image, it is necessary to locate an imaging device so as to protrude to the outside of the vehicle. Therefore, in order to obtain an ortho image, a dedicated device for obtaining the ortho image is necessary.

It is considered that an image of a road surface is taken at an angle by using a camera obliquely installed in an upper part of a vehicle. In a case wherein the camera installed in the upper part of the vehicle is used, it is possible to take an image of the road surface by diverting a device to take a at a image of the periphery of the road. However, in this case, the image data obtained is not an ortho image.

Detection of cracks on a road surface is made by generating an ortho image by converting image data obtained by taking an an image at an angle (Patent Literature 1).

CITATION LIST

Patent Literature

Patent Literature 1: JP 2018-21375 A

SUMMARY OF INVENTION

Technical Problem

Image data obtained by taking an image from an angle has different resolution by position. Therefore, when a crack is detected by simply using image data obtained by taking an mage from an angle, there is a possibility that the crack cannot be detected appropriately.

The present invention is aimed at making it possible to detect a crack on a road surface appropriately by using image data obtained by taking an image of the road surface from an angle.

Solution to Problem

A crack detection device according to one aspect of the present invention includes:

an image acquisition unit to acquire image data acquired by imaging a road surface from an oblique direction with respect to the road surface;

an image classification unit to classify the image data acquired by the image acquisition Unit into an acceptable range with a resolution higher than a standard value, and an unacceptable range with a resolution equal to or less than the standard value; and a data output unit to output acceptable data being image data of a part classified into the acceptable range by the image classification unit, as data to detect a crack on the road surface.

Advantageous Effects of Invention

In the present invention, image data of a part of an acceptable range with a resolution higher than a standard value among image data obtained by taking an image of a road surface from an oblique directions with respect to the road surface, as data for detecting a crack on the road surface. In this manner, it is prevented that detection of a crack is performed based on image data whereby it is difficult to detect a crack. As a result, it is possible to appropriately detect a crack on a road surface.

DESCRIPTION OF EMBODIMENTS

First Embodiment

Description of Configuration

Figure 1:
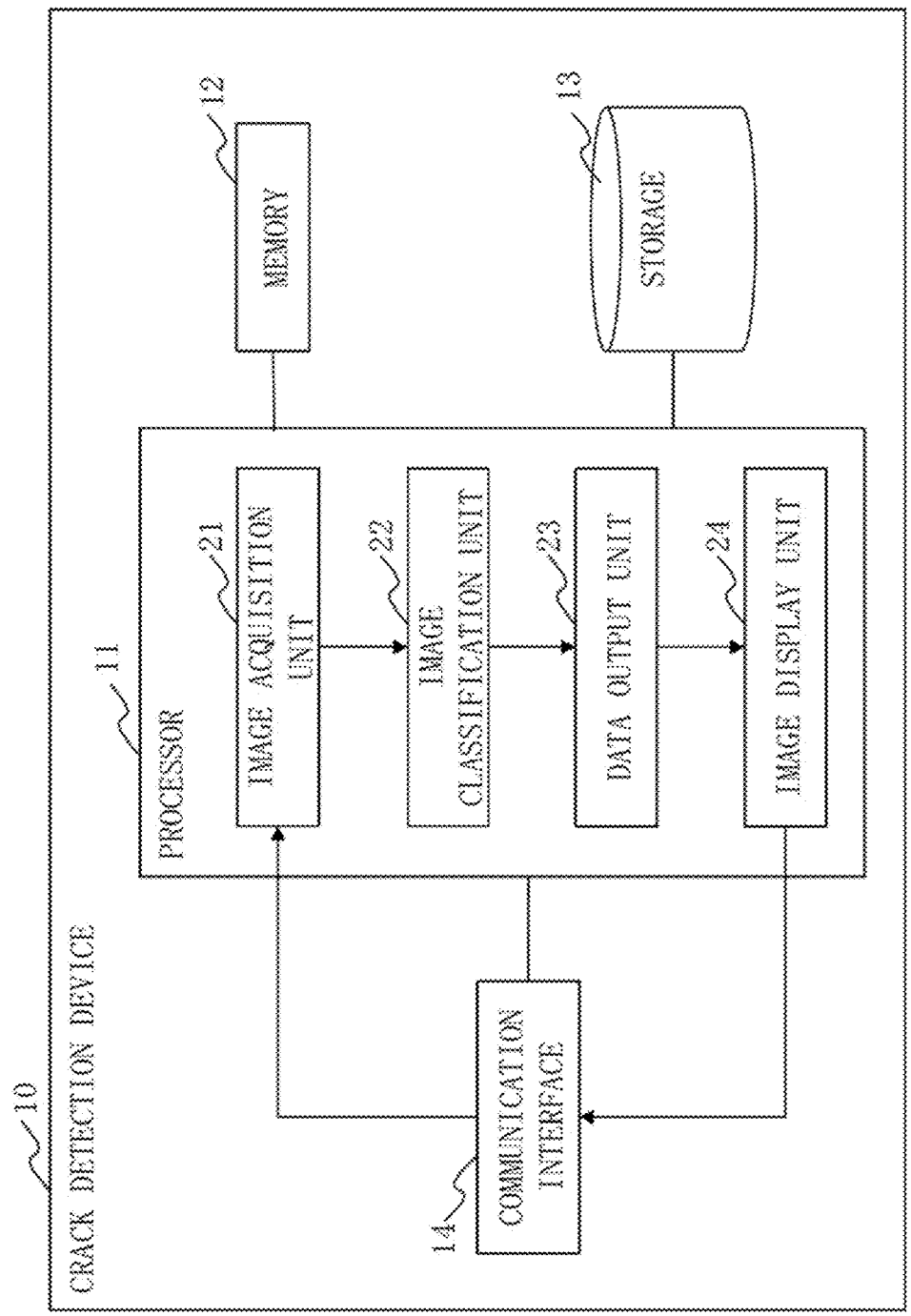
FIG. 1 is a configuration diagram of a crack detection device 10 according to a first embodiment.

With reference to FIG. 1, a configuration of a crack detection device 10 according to a first embodiment will be described.

The crack detection device 10 is a computer. The crack detection device 10 detects a crack on a road surface from image data obtained by taking an image of a road surface from an oblique direction with respect to the road surface.

The crack detection device 10 includes hardware components of a processor 11, memory 12, storage 13 and a communication interface 141. The processor 11 is connected to other hardware components via a signal line, to control the other hardware components.

The processor 11 is an integrated circuit (IC) to perform processing. The processor 11 is a central processing unit (CPU), a digital signal processor (DSP) or a graphics processing unit (GPU), as a specific example.

The memory 12 is a storage device to temporarily store data. The memory 12 is a static random access memory (SRAM) or a dynamic random access memory (DRAM), as a specific example.

The storage 13 is a storage device to save data. The storage 13 is, as a specific example, a hard disk drive (HDD). Further, the storage 13 may be a portable recording medium such as a secure digital (SD, registered trademark) memory card, a compact flash (CF, registered trademark), NAND flash, a flexible disk, an optical disk, a compact disk, a Blue-ray (registered trademark) disk, or a digital versatile disk (DVD).

The communication interface 14 is an interface to communicate with external devices. The communication interface 14 is a port of, as a specific example, an Ethernet (registered trademark), a universal serial bus (USB) board, or a high-definition multimedia interface (HDMI, registered trademark).

The crack detection device 10 includes, as functional components, an image acquisition unit 21, an image classification unit 22, a data output unit 23 and an image display unit 24. The functions of each functional component of the crack detection device 10 are realized by software.

In the storage 13, a program to realize the functions of each functional component of the crack detection device 10 are stored. The programs are read into the memory 12 by the processor 11, and executed by the processor 11. In this manner, the functions of each functional component of the crack detection device 10 are realized.

In FIG. 1, only one processor 11 is illustrated. However, a plurality of processors 11 may exist, and the plurality of processors 11 may execute the program to realize each function in cooperation.

Figure 2:
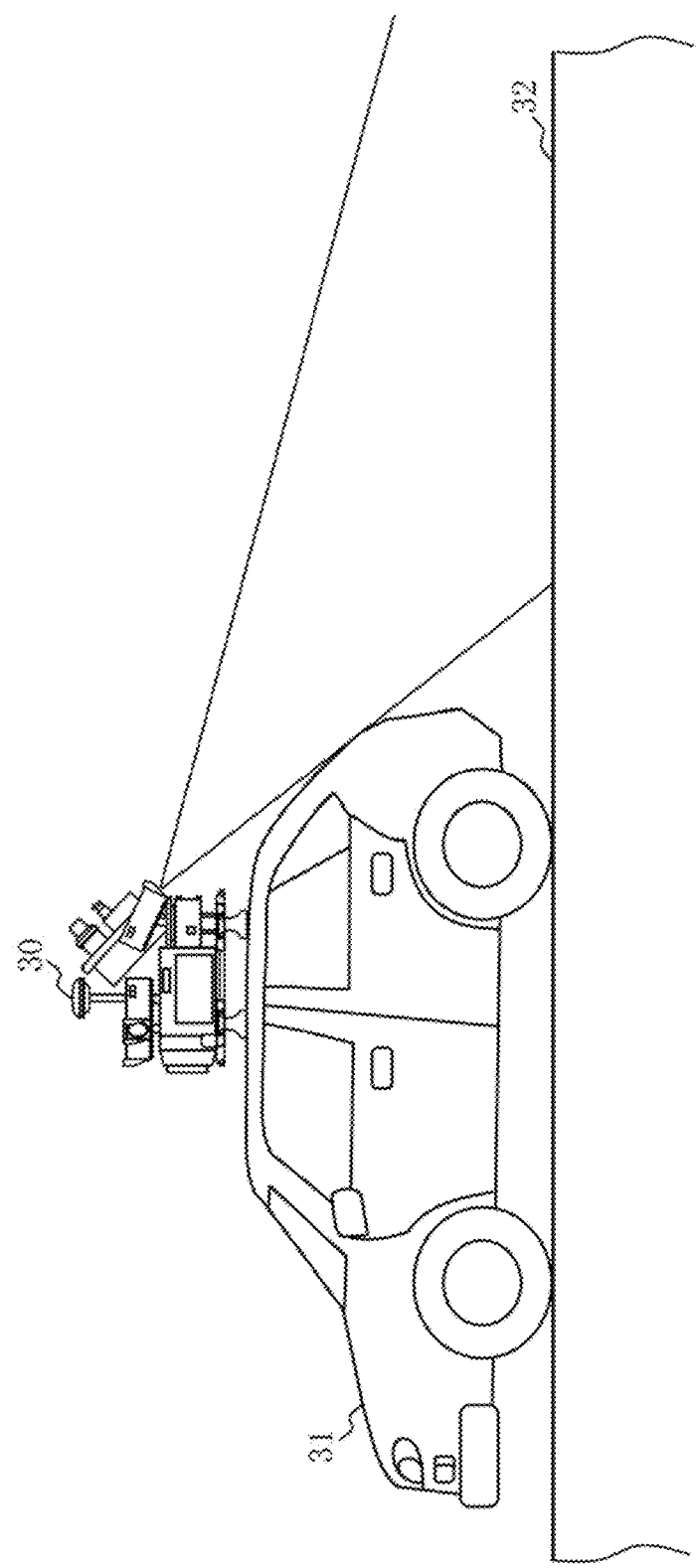
FIG. 2 is a configuration diagram of an imaging device 30 according to the first embodiment.

With reference to FIG. 2, the configuration of an imaging device 30 to take an image of a road surface from an oblique direction with respect to the road surface will be described.

The imaging device 30 is mounted on an upper part of a vehicle 31 being a moving object. In FIG. 2, the imaging device 30 takes an image of a road surface 32 on a back side of the vehicle 31 from the upper part oldie vehicle 31. In this manner, image data obtained by taking an image with the imaging device 30 becomes the image data by taking an image of the road surface 32 from the oblique direction with respect to the road surface 32.

Explanation of Operation

With reference to FIG., 3 through FIG., 7, an operation of the crack detection device 10 according to the first embodiment will be described.

An operation procedure of the crack detection device 10 according to the first embodiment corresponds to a crack detection method according to the first embodiment. Further, a program to realize an operation of the crack detection device 10 according to the first embodiment corresponds to a crack detection program according to the first embodiment.

Figure 3:
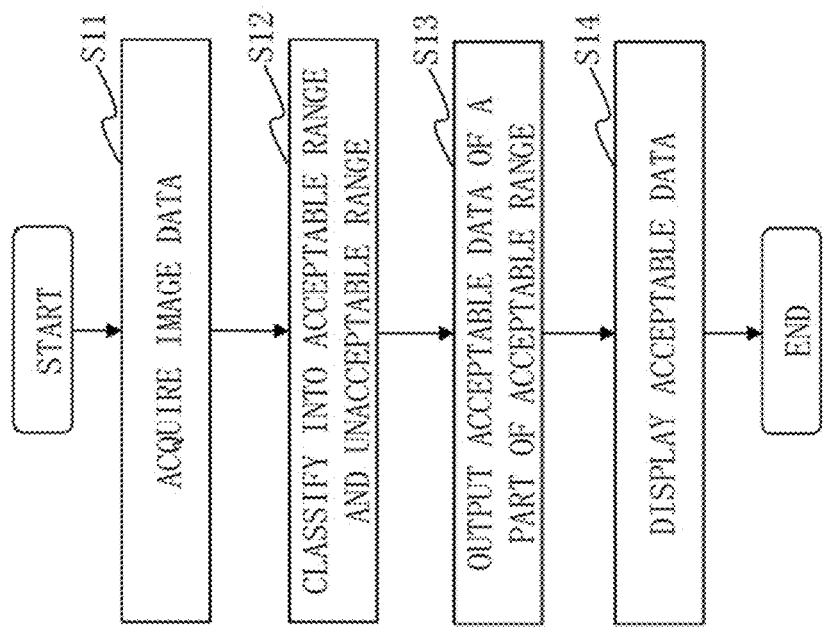
FIG. 3 is a flowchart illustrating an operation of the crack detection device 10 according to the first embodiment.

(Step S12 of FIG. 3: Image Acquisition Process)

The image acquisition unit 21 acquires image data obtained by taking an image of the road surface 32 from an oblique direction with respect to the road surface 32 with the imaging device 30.

(Step S12 of FIG. 3: Image Classification Process)

The image classification unit 22 classifies the image data acquired in step S11 into an acceptable range with a resolution higher than a standard value, and an unacceptable range with a resolution equal to or lower than the standard value.

Figure 4:
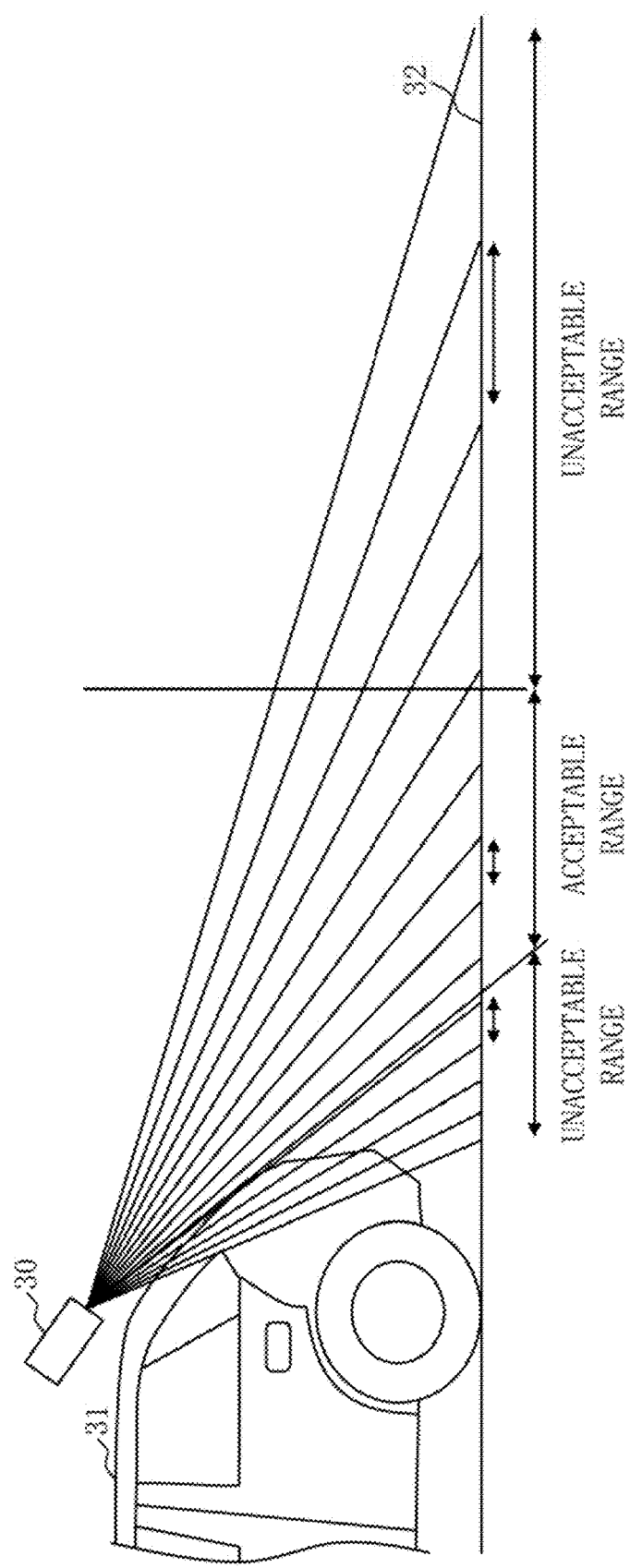
FIG. 4 is an explanatory drawing: of an image classification process according to the first embodiment.

Specifically, as illustrated in FIG. 4, the image classification unit 22 classifies the image data into the acceptable range and the unacceptable range in response to a distance from the imaging device 30. As the distance from the imaging, device 30 becomes smaller, the resolution becomes higher; meanwhile, as the distance from the imaging device 30 becomes larger, the resolution becomes lower. Therefore, the image classification unit 22 classifies a part of the range whose distance is small from the imaging device 30 into the acceptable range, and classifies the other into the unacceptable range.

Figure 5:
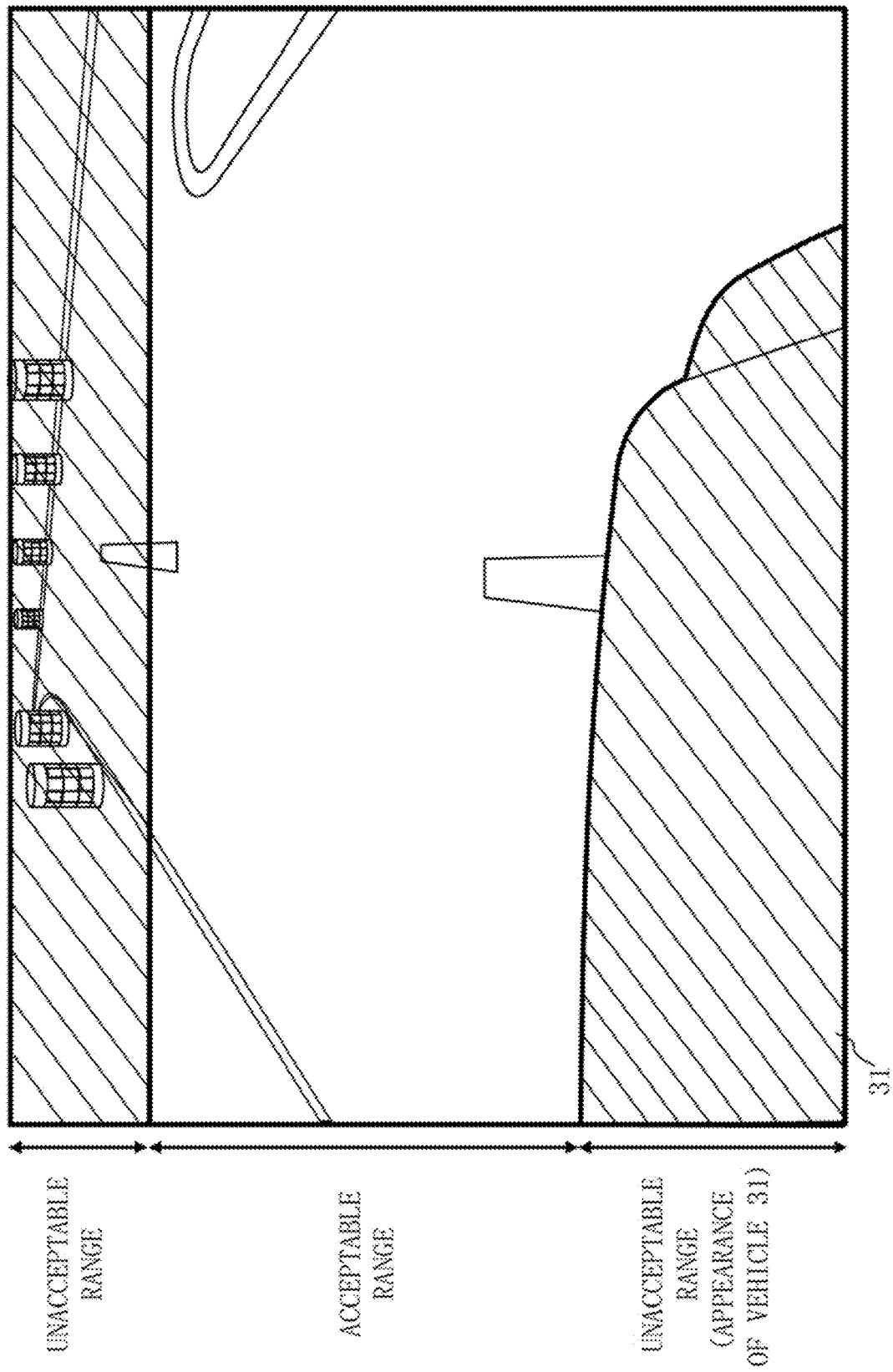
FIG. 5 is an explanatory drawing of the image classification process according to the first embodiment.

As illustrated in FIG. 5, the vehicle 31 whereon the imaging, device 30 is mounted appears in a part of the image data depending on how the imaging device 30 is installed. In this case, in the range wherein the vehicle 31 appears, the resolution is high; however, since the road surface 32 does not appear, it is impossible to use the range for detection of a crack on the road surface 32. Therefore, the image classification unit 22 classifies the range wherein the vehicle 31 appears as well into the unacceptable range.

Figure 6:
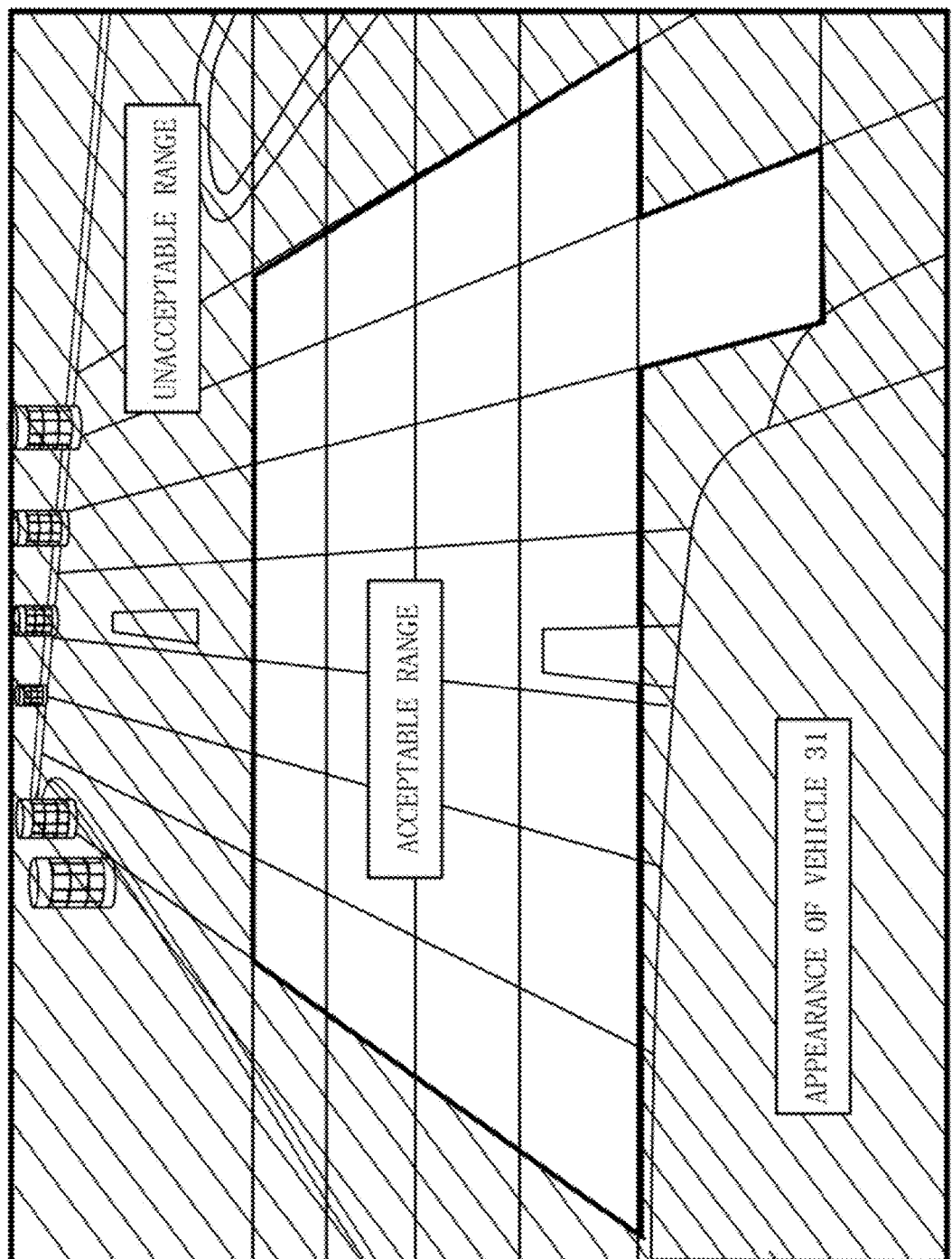
FIG. 6 is an explanatory drawing of the image classification process according to the first embodiment.

There is a case wherein the road surface 32 is divided into rectangular areas of a prescribed sin, and soundness of the road surface 32 is determined based on the number of cracks included in each rectangular area in this case, as illustrated in FIG. 6, the image classification unit 22 classifies, as the acceptable range, a range Whose resolution is higher than a standard value, wherein the vehicle 31 does not appear, and which is capable of being cut into rectangular ranges of a prescribed size, and the other as the unacceptable range.

(Step S13 of FIG. 3: Data Output Process)

The data output unit 23 outputs acceptable data being image data of a part classified into the acceptable range in Step S12 as data to detect a crack on the road surface 32. In the first embodiment, the data output unit 23 outputs the acceptable data to the image display unit 24.

(Step S14 of FIG. 3: Image Display Process)

The image display unit 24 displays the acceptable data being data output in Step S13 on a display device.

Figure 7:
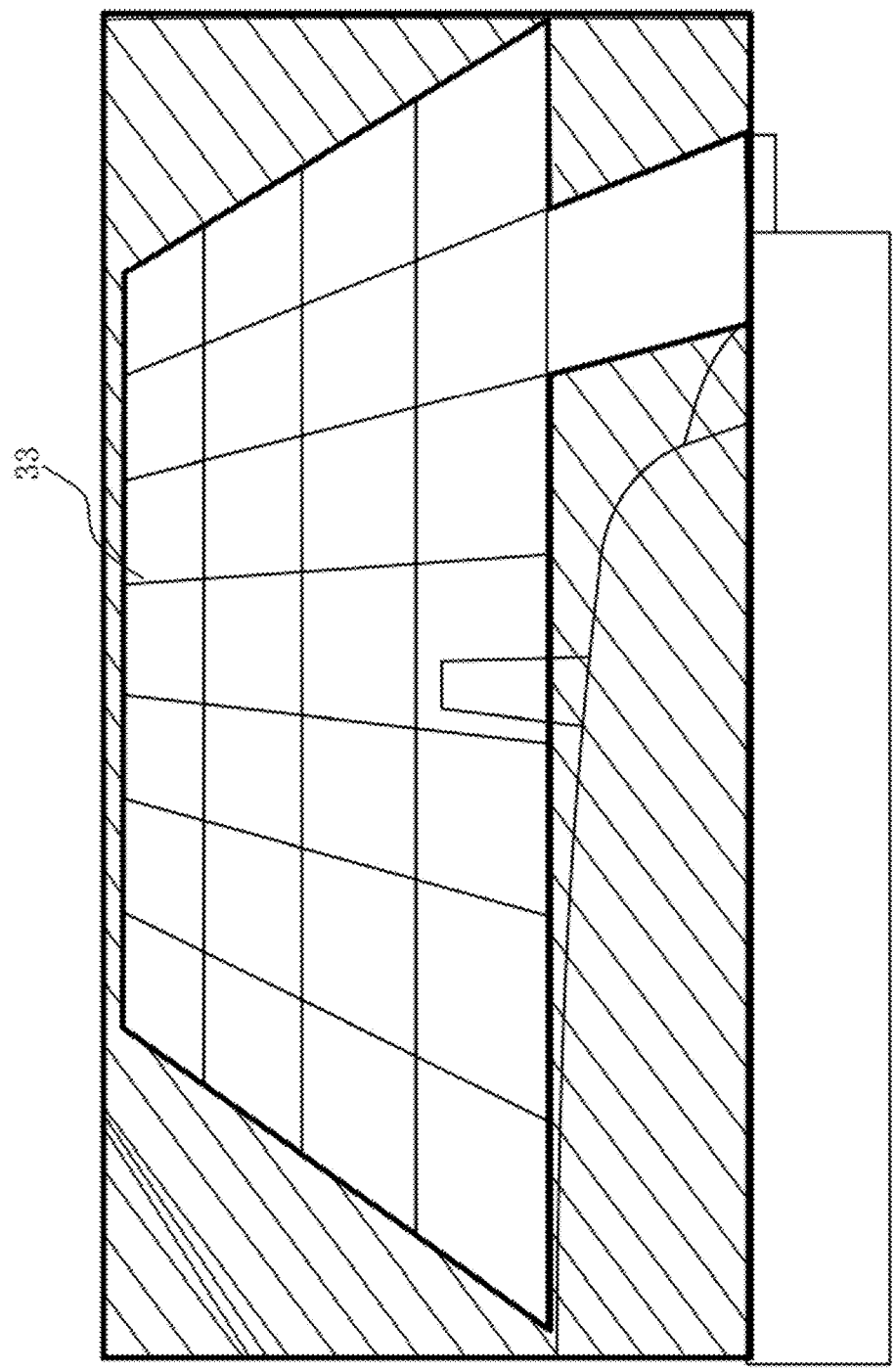
FIG. 7 is an explanatory drawing of an image display process according to the first embodiment.

In a case wherein the road surface 32 is divided into rectangular areas of a prescribed size, and soundness of the road surface 32 is determined based on the number of cracks included in each rectangular area, as illustrated in FIG. 7, the data output unit 23 displays the acceptable data Iv indicating a parting line 33 of the rectangular areas.

A worker who detects cracks by sight detects the cracks from the acceptable data displayed in step S14.

Effect of First Embodiment

As stated above, the crack detection device 10 according to the first embodiment displays image data of a part of an acceptable range with a resolution higher than a standard value among the image data obtained by taking an image of a road surface from an oblique direction with respect to the road surface as data to detect cracks on the road surface.

In this manner, detection of cracks is prevented from being performed based on image data whereby it is difficult to detect a crack. That is, detection of cracks is prevented from being performed based on image data whereby it is difficult to determine whether cracks exist even when cracks actually exist. As a result, it is possible to suitably detect cracks on the road surface 32.

Other Configurations

<First Variation>

Figure 8:
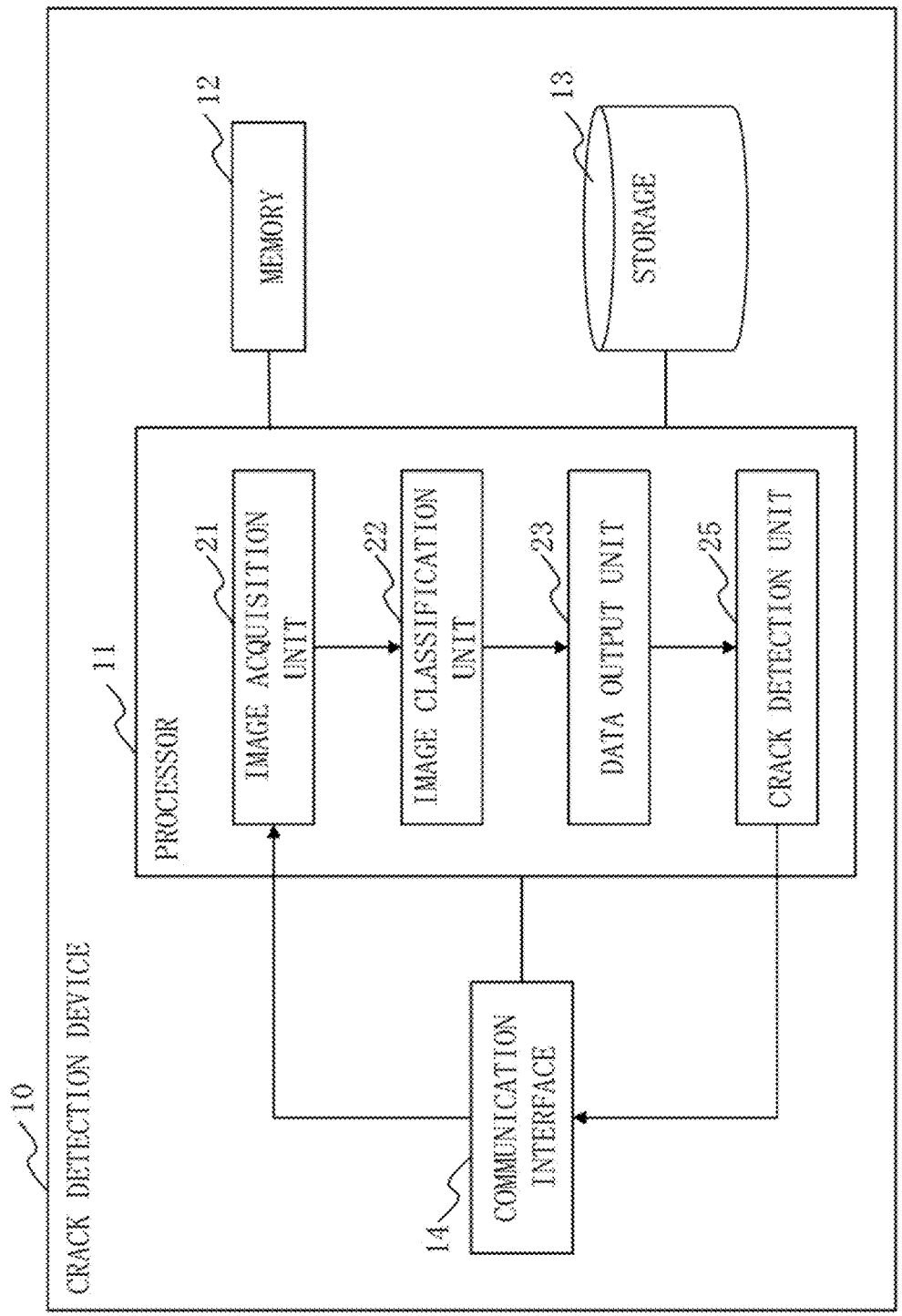
FIG. 8 is a configuration diagram of the crack detection device 10 according to a first variation.

In the first embodiment, detection of cracks is performed by sight. However, cracks may be automatically detected from image data. In this case, as illustrated in FIG. 8, the crack detection device 10 includes a crack detection unit 25 instead of the image display unit 24. The crack detection unit 25 detects cracks by using acceptable data being data output in step S13 as an input.

Also in a case wherein cracks are automatically detected, as with the first embodiment, detection of cracks is prevented from being performed based on image data whereby it is difficult to determine whether cracks exist, even when cracks actually exist. As a result, it is possible to suitably detect cracks on the road surface.

<Second Variation>

In the first embodiment, each functional, component is realized by software. However, as a second variation, each functional component may be realized by hardware. With respect to the second variation, description will be provided on parts different from the first embodiment.

Figure 9:
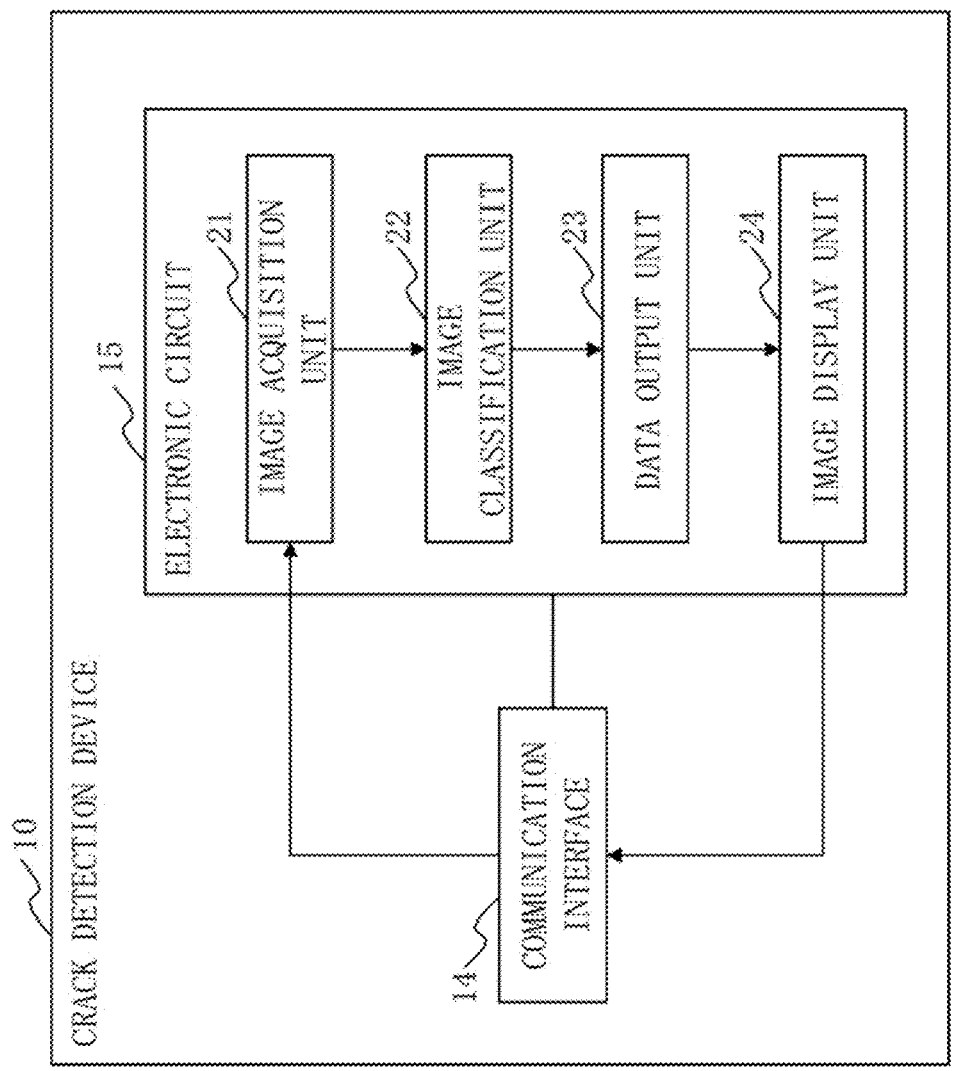
FIG. 9 is a configuration diagram of the crack detection device 10 according to a second variation.

With reference to FIG. 9, a configuration of the crack detection device 10 according to the second variation will be described.

In a case wherein each functional component is realized by hardware, the crack detection device 10 includes an electronic circuit 15 instead of the processor 11, the memory 12 and the storage 13. The electronic circuit 15 is a dedicated circuit for realizing the functions of the memory 12 and the storage 13.

As the electronic circuit 15, a single circuit, a composite circuit, a processor that is made into a program, a processor that is made into a parallel program, a logic IC, a gate array (GA), an application specific integrated circuit (ASIC), and a field-programmable gate army (FPGA) are considered.

Each functional component may be realized by one electronic circuit 15, or each functional component may be realized dispersively by a plurality of electronic circuits 15.

<Third Variation>

As a third variation, a part of each functional component may be realized by hardware components, and the other of each functional component may be realized by software.

The processor 11, the memory 12, the storage 13 and the electronic circuit 15 are called processing circuitry. That is, functions of each functional component are realized by the processing circuitry.

Second Embodiment

A second embodiment is different from the first embodiment in that effective data is extracted from acceptable data, and the effective data is output as data for detecting a crack on the road surface 32. In the second embodiment, description of these different parts is provided, and description of the same parts is omitted.

Explanation of Configuration

Figure 10:
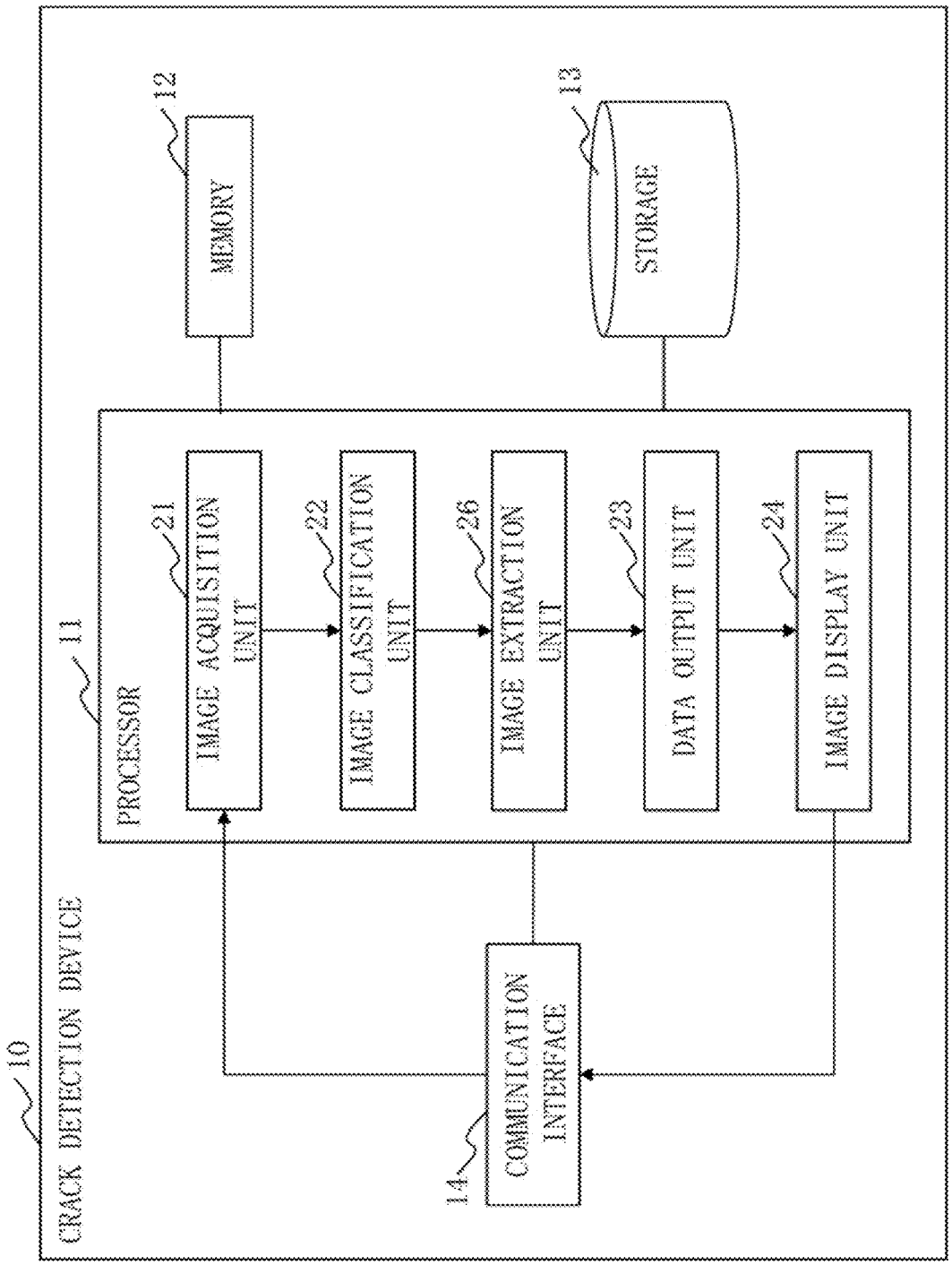
FIG. 10 is a configuration diagram of the crack detection device 10 according to a second embodiment.

With reference to FIG. 10, description will be made on a configuration of the crack detection device 10 according to the second embodiment.

The crack detection device 10 is different from the crack detection device 10 illustrated in FIG., 1 in that the crack detection device 10 includes an image extraction unit 26 as a functional component. The image extraction unit 26 is realized by software or a hardware component as with the other functional components.

Explanation of Operation

Figure 11:
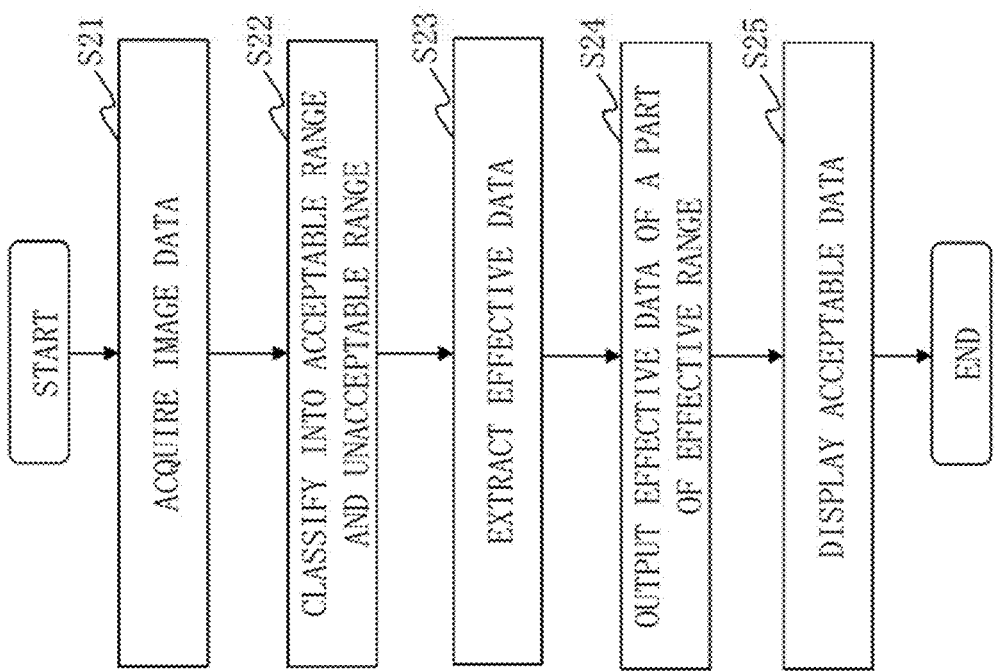
FIG. 11 is a flowchart illustrating an operation of the crack detection device 10 according to the second embodiment.
Figure 12:
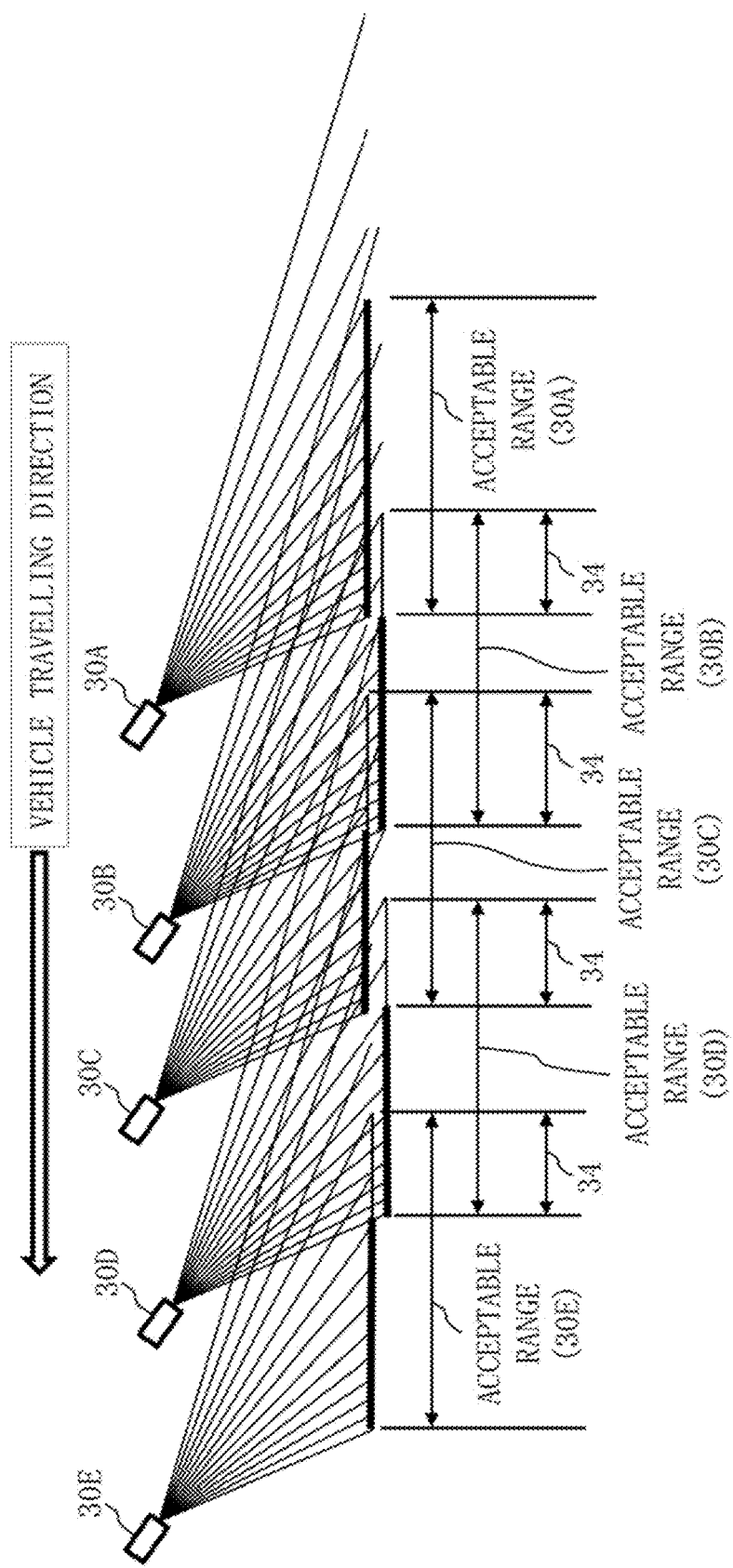
FIG. 12 is an explanatory drawing of an image extraction process according to the second embodiment.
Figure 13:
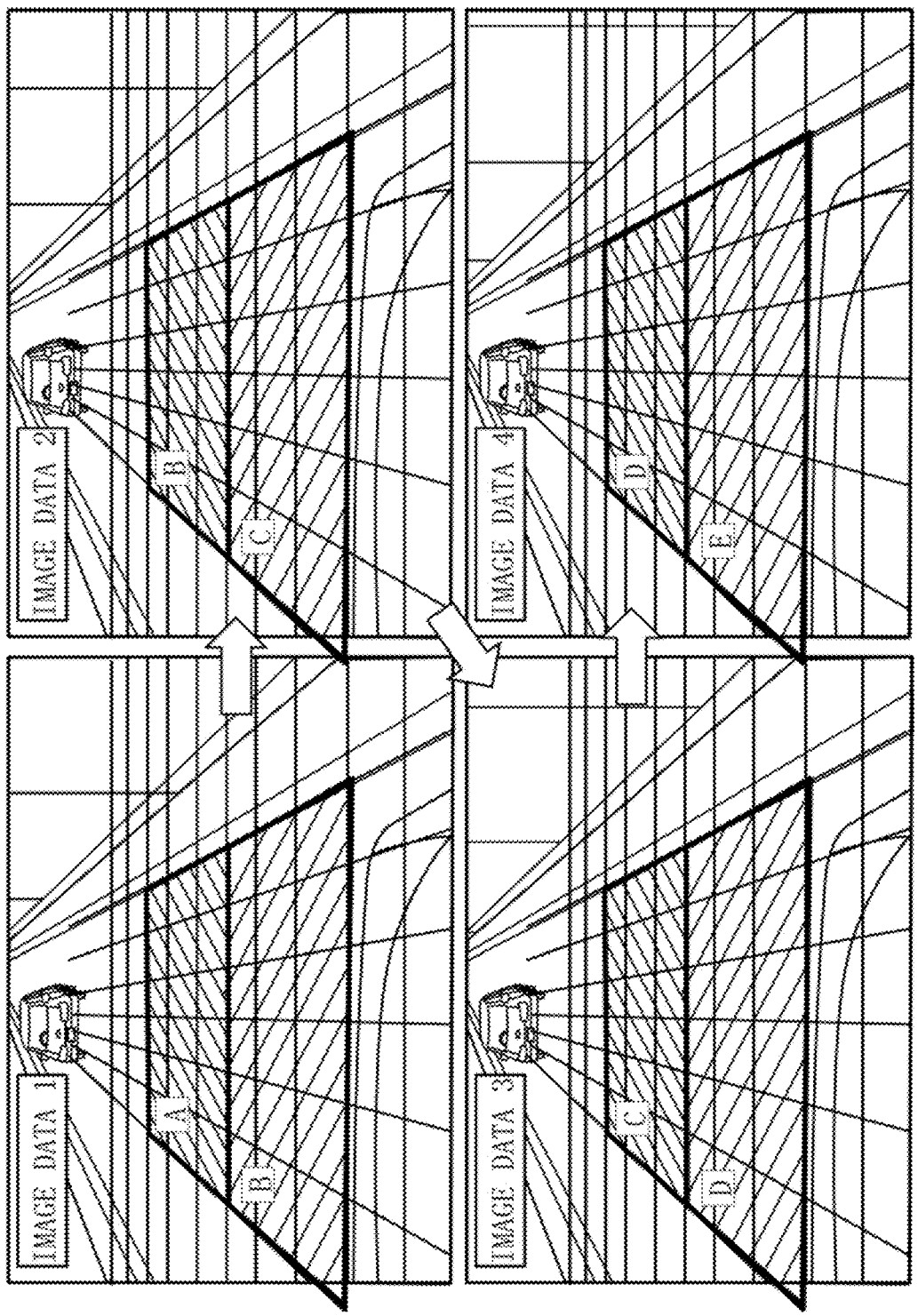
FIG. 13 is an explanatory drawing of the image extraction process according to the second embodiment.

With reference to FIG. 11 through FIG. 13, description will be made on an operation of the crack detection device 10 according to the second embodiment.

An operation procedure of the crack detection device 10 according to the second embodiment corresponds to a crack detection method according to the second embodiment. Further, a program to realize the operation of the crack detection device 10 according to the second embodiment corresponds to a crack detection program according to the second embodiment.

A process of step S22 is the same as the process of step S12 in FIG. 3. A process of step S25 is the same as the process of step S14 in FIG. 3.

(Step S21 in FIG. 11: Image Acquisition Process)

In the second embodiment, the image acquisition unit 21 acquires a plurality of pieces of image data acquired by repeatedly taking, images while the vehicle 31 is moving on a road, with the imaging device 30 mounted on the vehicle 31 being a moving object.

(Step S2.3 in FIG. 11: Image Extraction Process)

The image extraction unit 26 extracts effective data from acceptable data acquired from each of the plurality of pieces of image data repeatedly acquired, by retaining acceptable data with a high resolution with respect to an overlapping area 34 that overlaps with other acceptable data.

Specifically, as illustrated in FIG. 12, the plurality of pieces of image data are acquired by taking images of the overlapping area depending on imaging intervals. Further, there is a case wherein acceptable ranges with respect to each image data also overlap with each other. An area where the acceptable ranges overlap with one another is the overlapping area 34. In the area classified into the acceptable range, the closer the area is to the imaging device 30, the higher the resolution is. Therefore, with respect to the overlapping area 34, acceptable data in image data acquired earlier has a higher resolution than that of acceptable data in image data acquired later. Therefore, with respect to the overlapping area 34, the image extraction unit 26 retains the acceptable data in the image data acquired earlier, and deletes the acceptable data in the image data acquired later. Then, the image extraction unit 26 sets the acceptable data retained as effective data.

For example, as illustrated in FIG. 13, it is assumed that image data is acquired in an order of image data 1, image data 2, image data 3 and image data 4.

At this time, acceptable data of the image data 1 includes data of an area A and data of an area B. Further, acceptable data of the image data includes data of the area B and data of an area C. That is, the area B is the overlapping area 34. In the image data 1, the area B is closer to the imaging device 30 than in the image data 2. Therefore, with respect to the area B, the acceptable data of the image data 1 acquired earlier is retained, and the acceptable data of the image data 2 is deleted.

Similarly, the acceptable data of the image data 2 includes the data of the area B and the data of the area C. Further, acceptable data of the image data 3 includes data of the area C and data of an area D. That is, the area C is the overlapping area 34. In the image data 2, the area C closer to the imaging device 30 than in the image data 3. Therefore, with respect to the area C, the acceptable data of the image data 2 acquired earlier is retained, and the acceptable data of the image data 3 is deleted.

Similarly, the acceptable data of the image data 3 includes the data of the area C and data of an area D. Further, acceptable data of the image data 4 includes the data of the area D and data of an area E. That is, the area D is the overlapping area 34. In the image data 3, the area D is closer to the imaging, device 30 than in the image data 4. Therefore, with respect to the area D, the acceptable data of the image data 3 acquired earlier is retained, and the acceptable data of the image data 4 is deleted.

As a result, as effective data, it is included the data of the area A and the data of the area B being the acceptable data of the image data 1, the data of the area C being, the acceptable data of the image data 2, the data of the area D being the acceptable data of the image data 3 and the data of the area F being the acceptable data of the image data 4.

A part of the overlapping area 34 among the overlapping area 34 may remain overlapped, in the example of FIG. 13, a part of the area B close to the area C among acceptable data of the image data 2 may remain, without being deleted. Similarly, a part of the area D close to the area E among the acceptable data of the image data 4 may remain, without being deleted. In this manner, effective data of each image data is brought into a state of overlapping slightly with effective data of prior and posterior image data.

(Step S24 in FIG. 11: Data Output Process)

The data output unit 23 outputs the effective data extracted in step S23 as data for detecting a crack on a road surface.

Effect of Second Embodiment

As stated above, the crack detection device 10 according to the second embodiment extracts effective data from acceptable data obtained from each of a plurality of pieces of image data, by retaining acceptable data with a high resolution with respect to the overlapping area 34 that overlaps with other acceptable data. Then, the crack detection device 10 outputs the effective data as data for detecting a crack on the road surface 32.

In this manner, it is possible to detect a crack from image data with a higher resolution than in the first embodiment. As a result, it is possible to suitably detect a crack on the road surface 32.

Other Configurations

<Fourth Variation>

As with the first variation, detection of a crack may be performed automatically from image data without performing, detection of a crack by sight.

<Fifth Variation>

Figure 14:
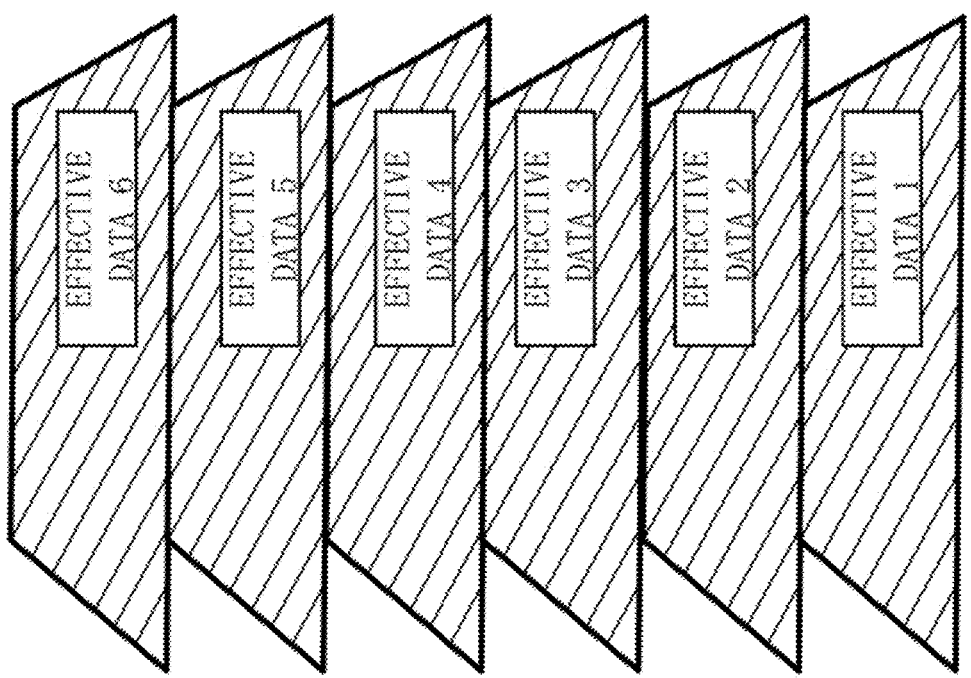
FIG. 14 is an explanatory drawing of an image display process according to a fifth variation.

In step 25 in FIG. 11, the image display unit 24 displays effective data being the data output in step S24. At this time, as illustrated in FIG. 14, the image display unit 24 may display at once effective data extracted from each of the plurality of pieces of image data by arranging the effective data in an acquisition order of the plurality of pieces of image data.

When detection of a crack is performed by sight, it is possible to detect the crack efficiently since a wide range of image data can be confirmed at once <Sixth Variation>

The imaging device 30 may take an image only of a partial area, whereby data with a resolution higher than a standard value can be acquired, whose distance from the imaging device 30 is within a reference interval, among an imaging area capable of being imaged. That is, the imaging device 30 may take an image of an area extracted as effective data among the imaging area.

In the second embodiment, it is assumed that an entire imaging area whose image is capable of being taken by the imaging device 30, and effective data is extracted from the image data acquired. However, when a shutter of the imaging device 30 is released every time the vehicle 31 moves for a fixed distance, or the shutter is released every prescribed time when the vehicle 31 moves at a regular speed, it is possible to specify beforehand an area extracted as effective data from image data acquired by taking an image of the entire imaging area. Furthermore, there is a device in the imaging device 30 which has a function to take an image only of a specified area among the imaging area. Thus, the area extracted as effective data is specified before, and the imaging device 30 takes an image only of the area extracted as the effective data.

For example, it is assumed that the vehicle 31 moves at 60 km/h (kilometers per hour), and the imaging device 30 takes an image at 68 FPS (frames per second). In this case, in theory, it is only necessary to take an image of 25 cm (centimeter) wide in a direction of movement of the vehicle 31.

However, in consideration of a case wherein a moving speed of the vehicle 31 changes to a certain extent, etc., it may be also possible to take an image of a width with a slight margin. For example, it may be also possible to take an image of 50 cm wide being twice the width.

As described, by narrowing down the area to take an image, there is no necessity to store redundant image data. Therefore, the data size of the image data is reduced.

There is a case wherein the number of pieces of image data capable of being acquired in a second is limited since the speed to write the image data into a storage device has reached a limit. In this case, by reducing the size of the image data, it is possible to increase the number of pieces of image data to be acquired in a second. When the number of pieces of image data to be acquired in a second is increased, only a part closer to the imaging device 30 from each image data is extracted as effective data. As a result, it is possible to detect a crack from image data with a higher resolution.

Third Embodiment

A third embodiment is different from the first and second embodiments in that a determination width being a lower limit value of a crack width to be detected is set based on a shutter speed of the imaging device 30 and a moving speed of the vehicle 31. In the third embodiment, description on the different parts is made, and description on the same parts is omitted.

In the third embodiment, description is made on a case wherein functions are added to the first embodiment. However, it may be also possible to add functions to the second embodiment.

Explanation of Configuration

Figure 15:
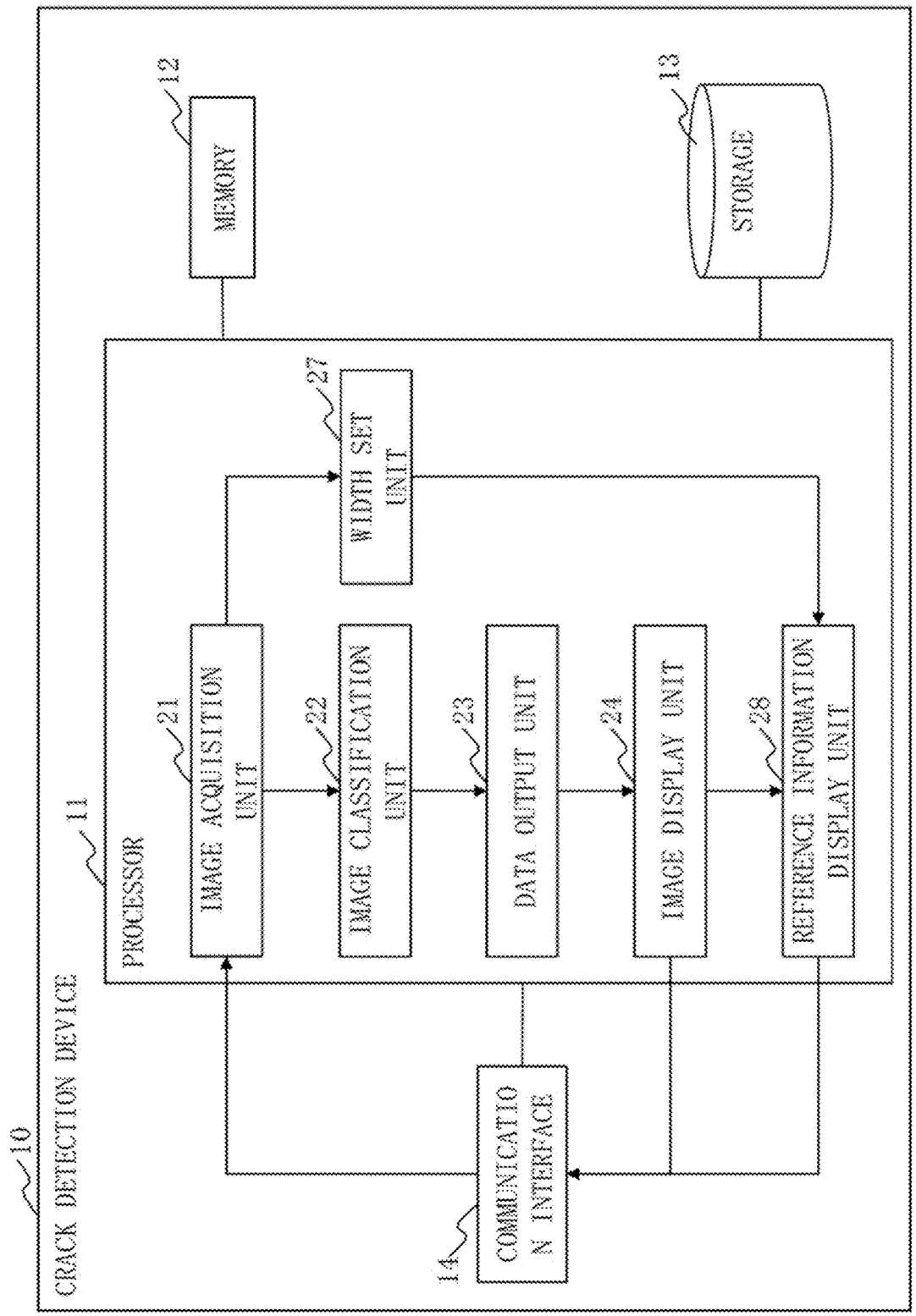
FIG. 15 is a configuration diagram of the crack detection device 10 according to a third embodiment.

With reference to FIG. 15, a configuration of the crack detection device 10 according to the third embodiment will be described.

The crack detection device 10 is different from the crack detection device 10 illustrated in FIG. 1 in that the crack detection device 10 includes a width set unit 27 and a reference information display unit 28, as functional components. The width set unit 27 and the reference information display unit 28 are realized by software or a hardware component, as with the other functional components.

Explanation of Operation

Figure 16:
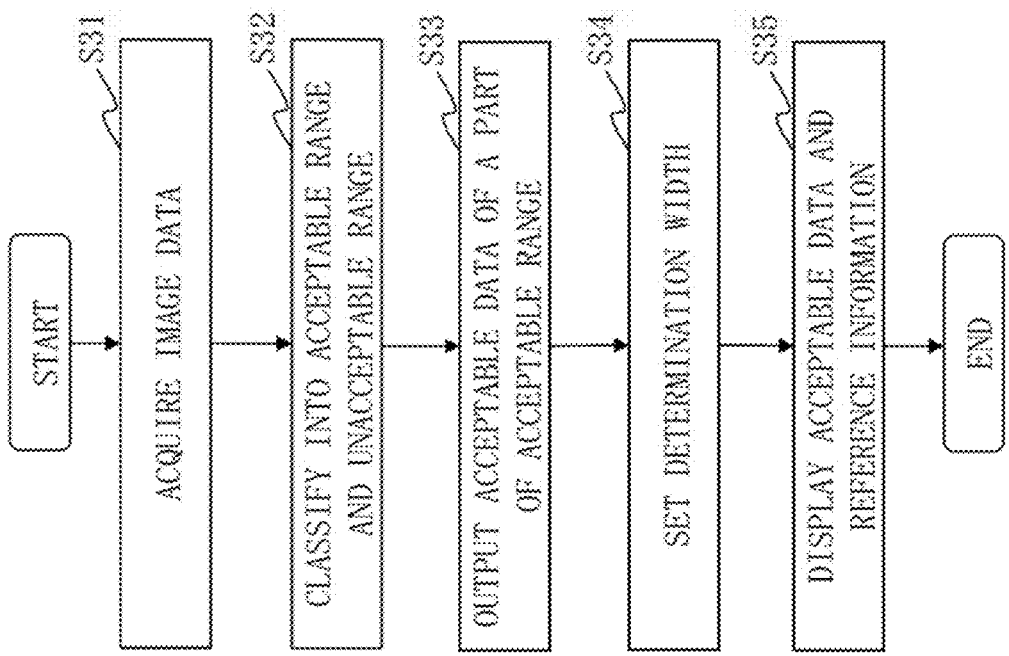
FIG. 16 is a flowchart illustrating an operation of the crack detection device 10 according to the third embodiment.
Figure 17:
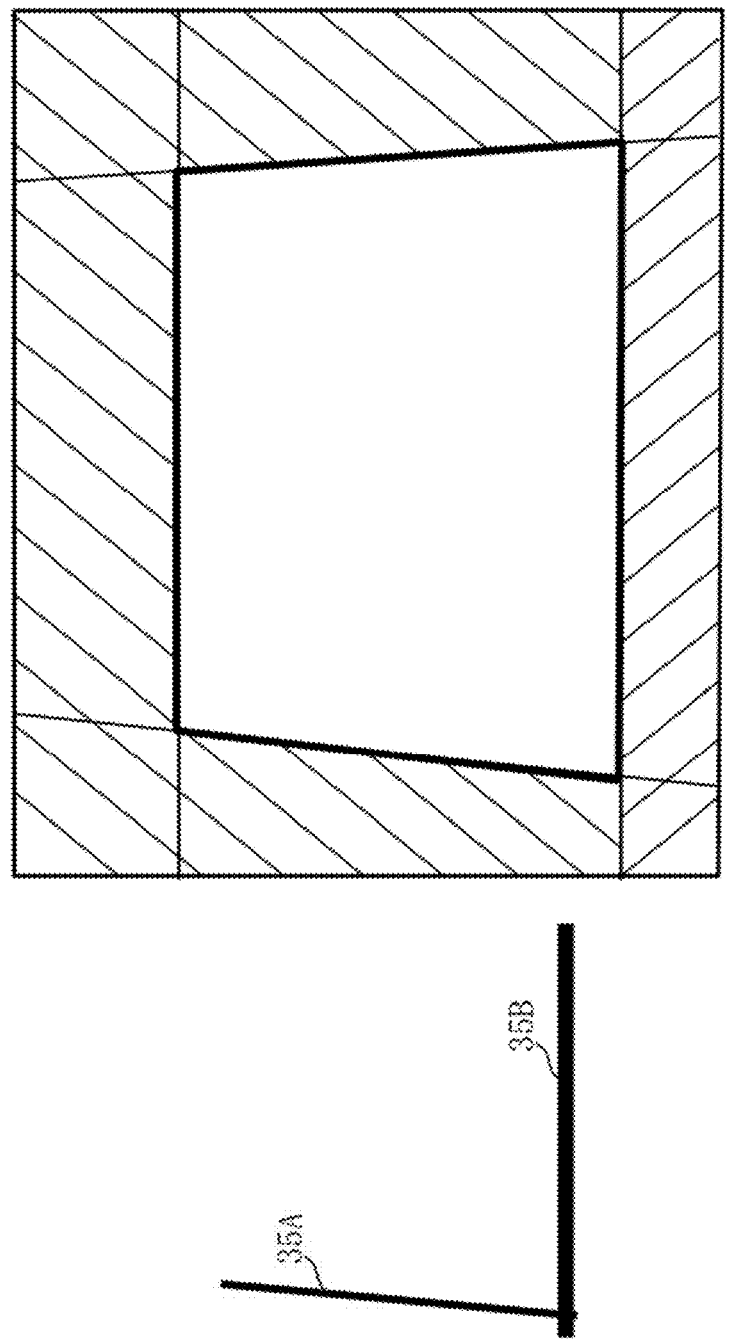
FIG. 17 is an explanatory drawing of an image display process according to the third embodiment.

With reference to FIG. 16 and FIG. 17, an operation of the crack detection device 10 according to the third embodiment will be described.

An operation procedure of the crack detection device 10 according to the third embodiment corresponds to a crack, detection method according to the third embodiment. Further, as program to realize the operation of the crack detection device 10 according to the third embodiment corresponds to a crack detection program according to the third embodiment.

A process from step S31 to step S33 is the same as the process, from step S11 to step S13 in FIG. 3.

(Step S34 in FIG. 16: Width Set Process)

The width set unit 27 acquires information indicating a shutter speed of the imaging device 30 and a moving speed of the vehicle 31 at the time when image data acquired in step S31 is acquired. Specifically, when the image data imaged by the imaging device 30 is stored, the shutter speed and the speed of the vehicle 31 are stored together. The width set unit 27 reads out information indicating the shutter speed and the speed of the vehicle 31 stored with the image data.

The width set unit 27 sets a determination width being, a lower limit value of a crack width to be detected in accordance with the shutter speed and the moving speed indicated in the information acquired.

When the imaging device 30 takes images while the vehicle 31 is moving, an image is extended in a traveling direction by the shutter speed. Therefore, when there is a crack on the road surface 32, the crack is also extended in the traveling direction.

For example, it is assumed that the vehicle 31 moves at 60 km/h, and the imaging device 30 takes images at a shutter speed a 0.05 msec (millisecond). In this case, the vehicle 31 moves for 0.83 mm (millimeter) when the shutter is opened. Therefore, a crack width is extended for 0.83 mm (millimeter) in the travelling direction of the vehicle 31. For example, the crack with a width of 1 mm is indicated as a crack with a width of 1.83 mm in the image data.

Thus, by taking into consideration the quantity of width to extend, a determination width being a lower limit value of the crack width is set.

For example, it is assumed that the vehicle 31 moves at 60 km/h, and the imaging device 30 takes images at the shutter speed of 0.05 msec (milliseconds), Further, it is assumed that a crack with a width of 1 mm or larger is detected. In this case, the determination width is set to be 1.83 mm.

(Step S35 in FIG. 16: Image Display Process)

The image display unit 24 displays data output in step S33. At this lime, the reference information display unit 28 displays reference information indicating the determination width set in step S34.

As a specific example, as illustrated in FIG. 17, the reference information display unit 28 displays a line 35 of the determination width as reference information in the vicinity of the data output in step S33. FIG. 17 illustrates a line 35A parallel to the moving direction of the vehicle 31 and a line 35B perpendicular to the travelling direction. The line 35A and the line 35B have different widths. This is because the width of the line 35B is extended, but the width of the line 35A is not extended since the determination width is extended in the travelling direction of the vehicle 31.

Effect of Third Embodiment

As stated above, the crack detection device 10 according to the third embodiment sets a determination width based on the shutter speed of the imagine device 30 and the tri welling speed of the vehicle 31. In this manner, a suitable determination width is set. As a result, it is possible to suitably detect a crack on the road surface 32.

Other Configurations

<Seventh Variation>

As with the first variation, detection of a crack may not be performed by sight, but may be automatically performed from image data. In this case, the crack detection unit 25 should detect a crack with a larger width than the determination width from the data output by the data output unit 23.

Since the determination width is extended in the travelling direction of the vehicle 31, it is necessary to detect a crack based on the determination width in accordance with a direction of the crack.

Fourth Embodiment

A fourth embodiment is different from the third embodiment in that a determination width being a lower limit value of a crack width to be detected is set in accordance with a position in image data. In the fourth embodiment, description is made on this different point, and description on the same points is omitted.

In the fourth embodiment, description is made on a case wherein a function is further added to the configuration wherein the function oldie third embodiment is added to the first embodiment. However, it is also possible to further add a function to the configuration wherein the function of the third embodiment is added to the second embodiment Explanation of Operation With reference to FIG. 18 and FIG. 19, an operation of the crack detection device 10 according to the fourth embodiment will be described.

An operation procedure of the crack detection device 10 according to the fourth embodiment corresponds to a crack detection method according to the fourth embodiment. Further, a program to realize the operation of the crack detection device 10 according to the fourth embodiment corresponds to a crack detection program according to the fourth embodiment.

Processes from step S41 to step S43 are the same as the processes from step S31 to step S33 in FIG. 16.

Figure 18:
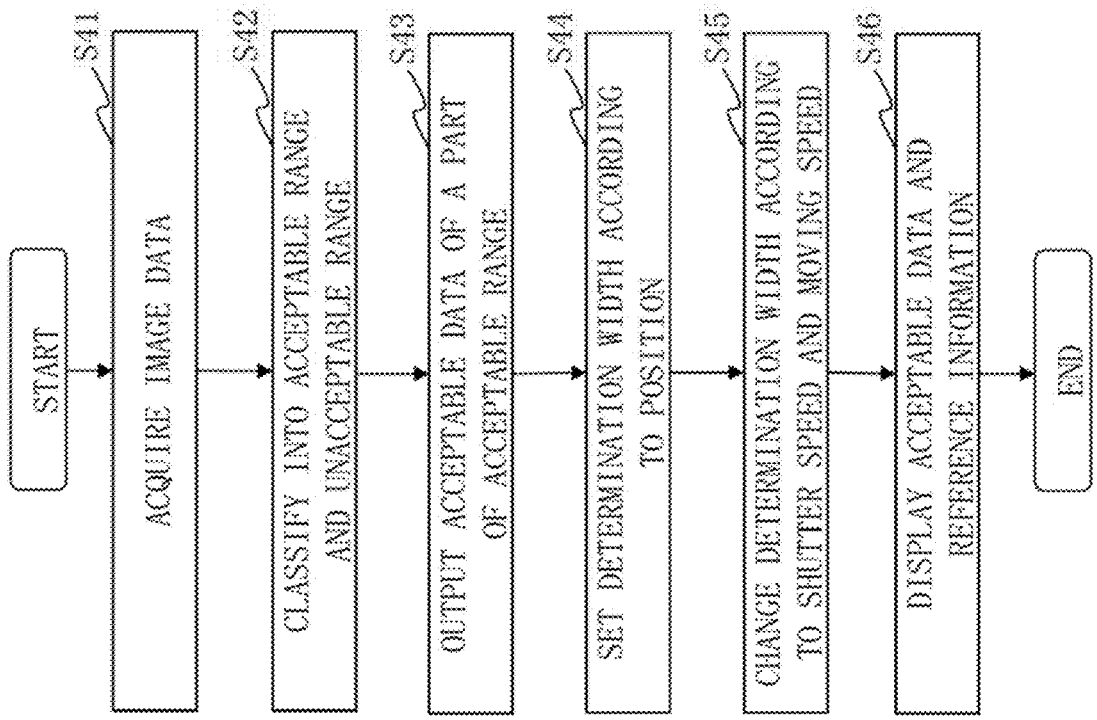
FIG. 18 is a flowchart illustrating an operation of the crack detection device 10 according to a fourth embodiment.

(Step S44 in FIG. 18: First Width Set Process)

The width set unit 27 sets a determination width being a lower limit value of a crack width to be detected in accordance with a position in image data.

Specifically, the width set unit 27 sets, for each area acquired by dividing acceptable data being data output in, step S43, a determination width in accordance with a position of the area. In image data acquired by taking images from an angle, the resolution varies with the position, and even cracks with the same width are represented in different widths depending on the positions in the image data. That is, even cracks with the same width are represented in different pixel numbers depending on the positions. Specifically, even cracks with the same width are represented in a smaller width as the distance from the imaging device 30 becomes larger. Therefore, the farther the distance is from the imaging device 30, the smaller the determination width is set.

For example, in a case wherein a crack with a width of 1 mm or more is detected from image data imaged in 0.3 mm/pixel, it is only necessary to detect cracks with a width of two pixels or more. However, in image data acquired by taking images from an angle, the resolution varies with the position, wherein it is 0.25 mm/pixel in the vicinity of the imaging device 30; while it is 1 mm/pixel in a position distant from the imaging device 30. In this case, in order to detect a crack with a width of 1 mm or more, it is only necessary to detect a crack with a width of 4 pixels or more in the vicinity of the imaging device 30, and to detect a crack with a width of 1 pixel or more in a position distant from the imaging device 30. That is, the width set unit 27 sets the determination width to 4 pixels in the vicinity of the imaging device 30, and sets the determination width to 1 pixel in a position distant from the imaging device 30.

(Step S45 in FIG. 18: Second Width Set Process)

The width set unit 27 changes the determination width set in step S44 in accordance with a shutter speed and a moving speed. That is, the width set unit 27 extends the determination width set in step S44 in a travelling direction in accordance with the shutter speed and the moving speed.

(Step S6 in FIG. 18: Image Display Process)

The image display unit 24 displays data output in step S43. In this case, the reference information display unit 28 displays reference information indicating the determination width set in step S45.

Figure 19:
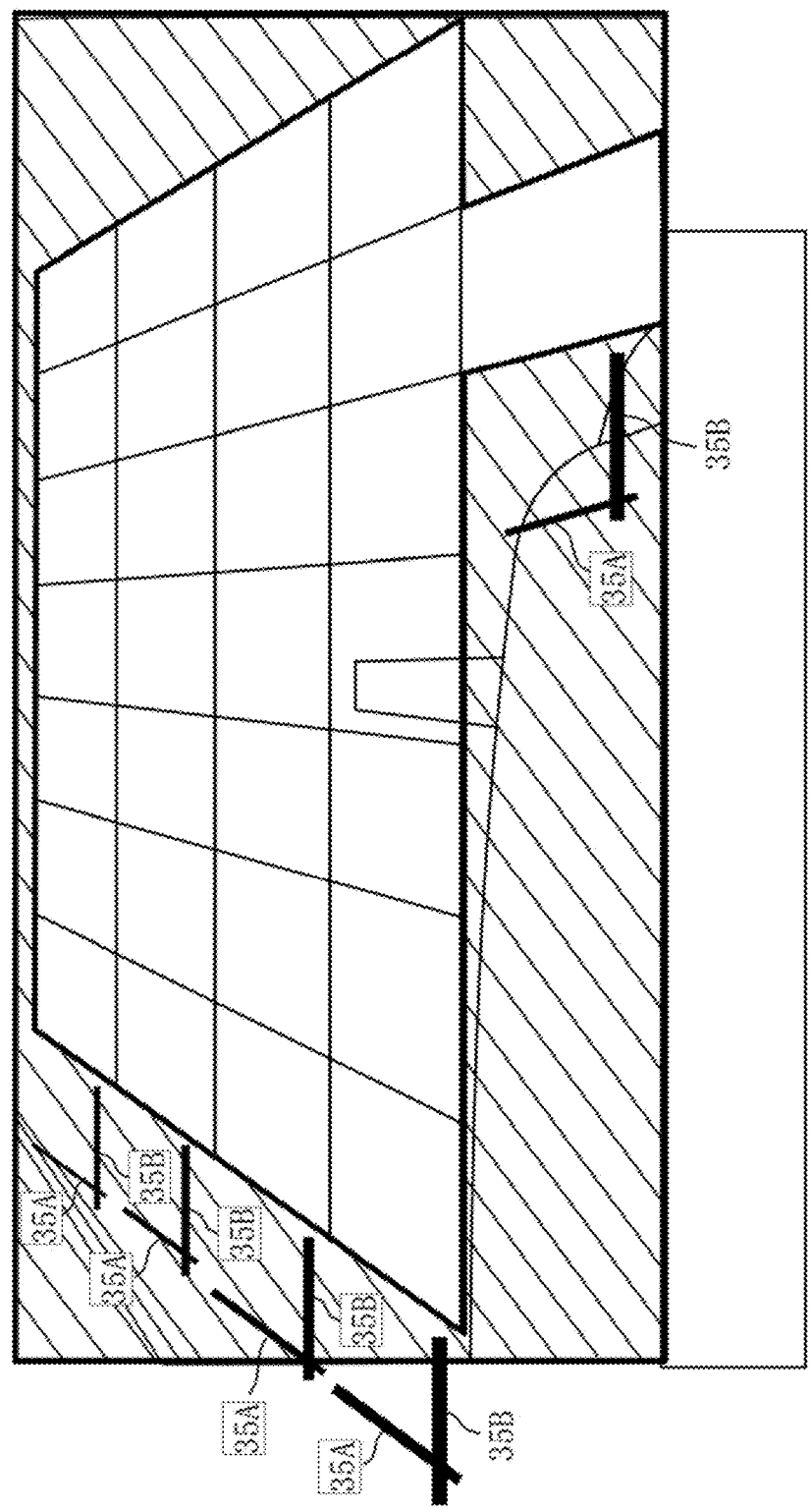
FIG. 19 is an explanatory drawing of an image display process according to the fourth embodiment.

As a specific example, as illustrated in FIG. 19, the reference information display unit 28 displays a line 35 of a determination width for each position in the vicinity of data output in step S43 as reference information. In FIG. 19, acceptable data being data output in step S43 is divided into a plurality of rectangular areas. Then, for each rectangular area, a determination width is set in accordance with a distance from the imaging device 30, and the line 35 of the determination width 35 is displayed as reference information for each distance from the imaging, device 30.

Effect of Fourth Embodiment

As stated above, the crack detection device 10 according to the fourth embodiment sets a determination width being a lower limit value of a crack width to be detected in accordance with a position in the image data. In this manner, a suitable determination width is set. As a result, it is possible to suitably detect a crack on the road surface 32.

In an ortho image, cracks with the same width are represented in the same width irrespective of position. Therefore, in a case wherein a crack is detected by using image data acquired by taking images from an angle, the method described in the fourth embodiment is effective.

Other Configurations

<Eighth Variation>

In the fourth embodiment, the technique to set a determination width in accordance with a shutter speed and a moving speed as described in the third embodiment is also lased, however, it is also possible to set a determination width based simply on position without using the technique to set the determination width in accordance with the shutter speed and the moving speed.

In this case, the accuracy of the determination width is reduced. However, the accuracy of the determination width is higher compared to a case wherein the same determination width is used for entire image data.

Fifth Embodiment

In a fifth embodiment, the configuration of the imaging device 30 will be described. In the fifth embodiment, description is made on parts different from those in the first through fourth embodiments, and description on the same parts is omitted.

Explanation of Configuration

With reference to FIG. 20 to FIG. 23, the configuration of the imaging device 30 according to the fifth embodiment will be described.

Figure 20:
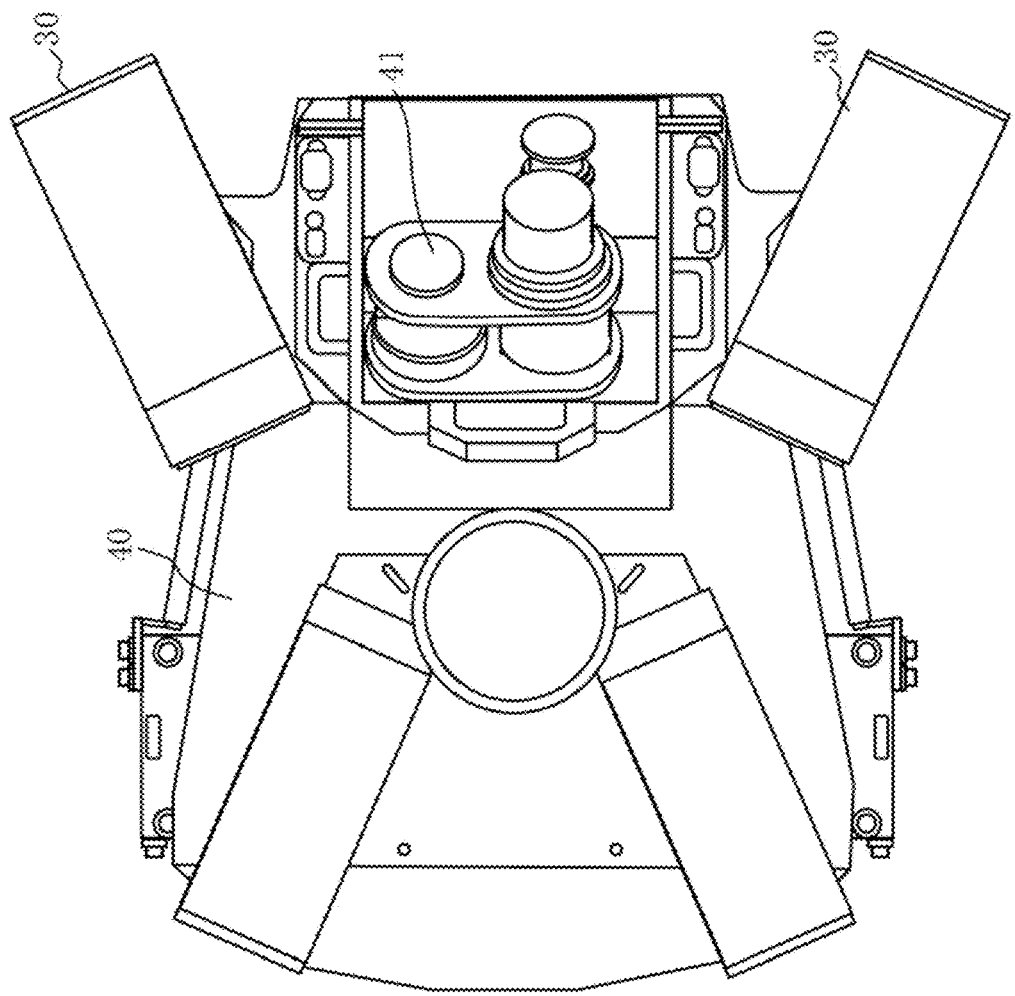
FIG. 20 is a configuration diagram of the imaging device 30 according to a fifth embodiment.

As illustrated in FIG. 20, in the ran embodiment, the imaging device 30 has a configuration capable of being attached to an existing measurement unit 40 to take an image of a forward side of the vehicle 31. Specifically, a part 41 mounted on the measurement unit 40 is detached, a mounting plate 42 (refer to FIG. 21) of the imaging device 30 is put on the measurement unit 40, and the part 41 is attached to the measurement unit 40 from an upper side of the mounting plate 42, In this manner, the mounting plate 42 of the imaging device 30 is attached to the measurement unit 40. In the fifth embodiment, the imaging device 30 is configured by two cameras.

Figure 21:
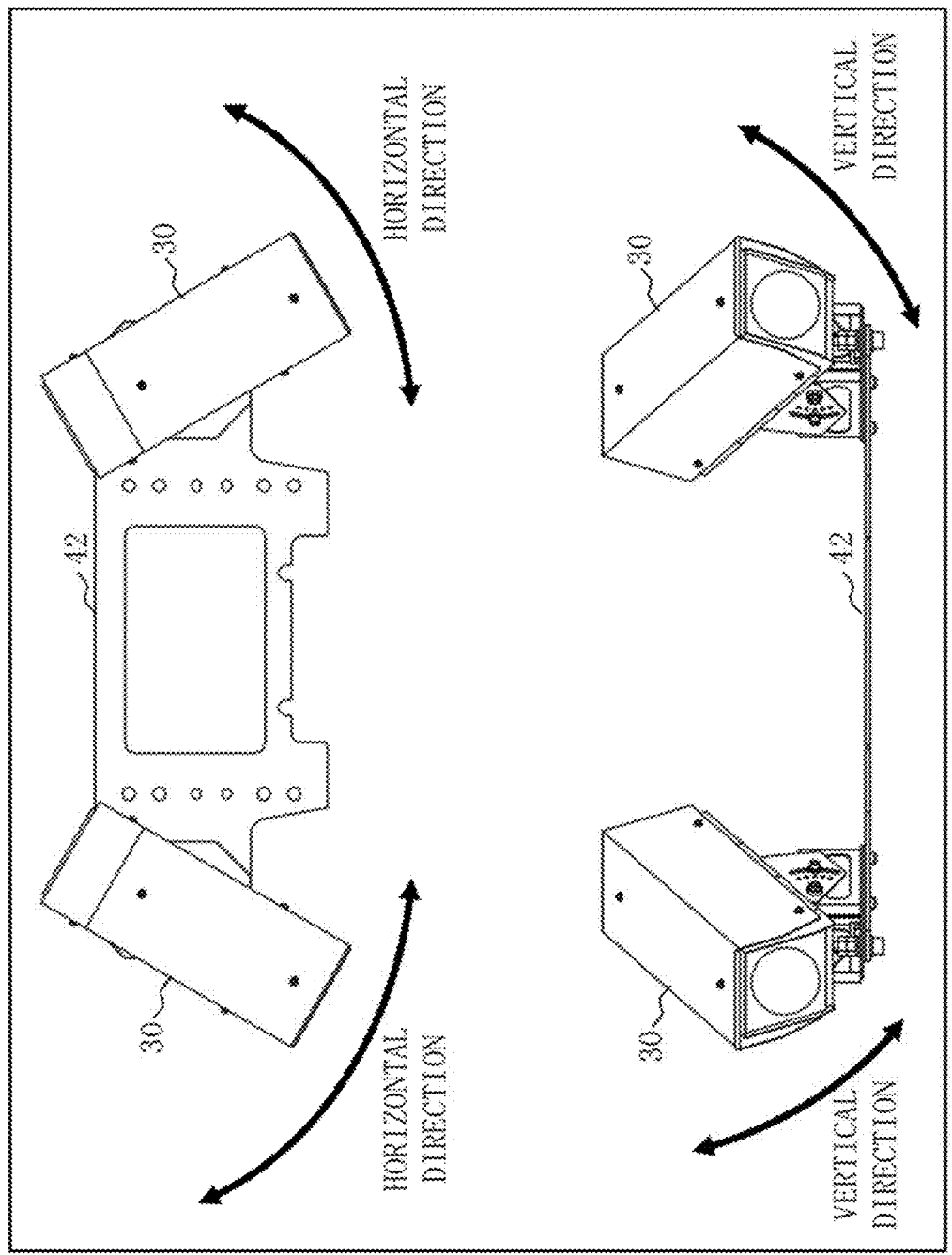
FIG. 21 is a configuration diagram of the imaging device 30 according to the fifth embodiment.
Figure 22:
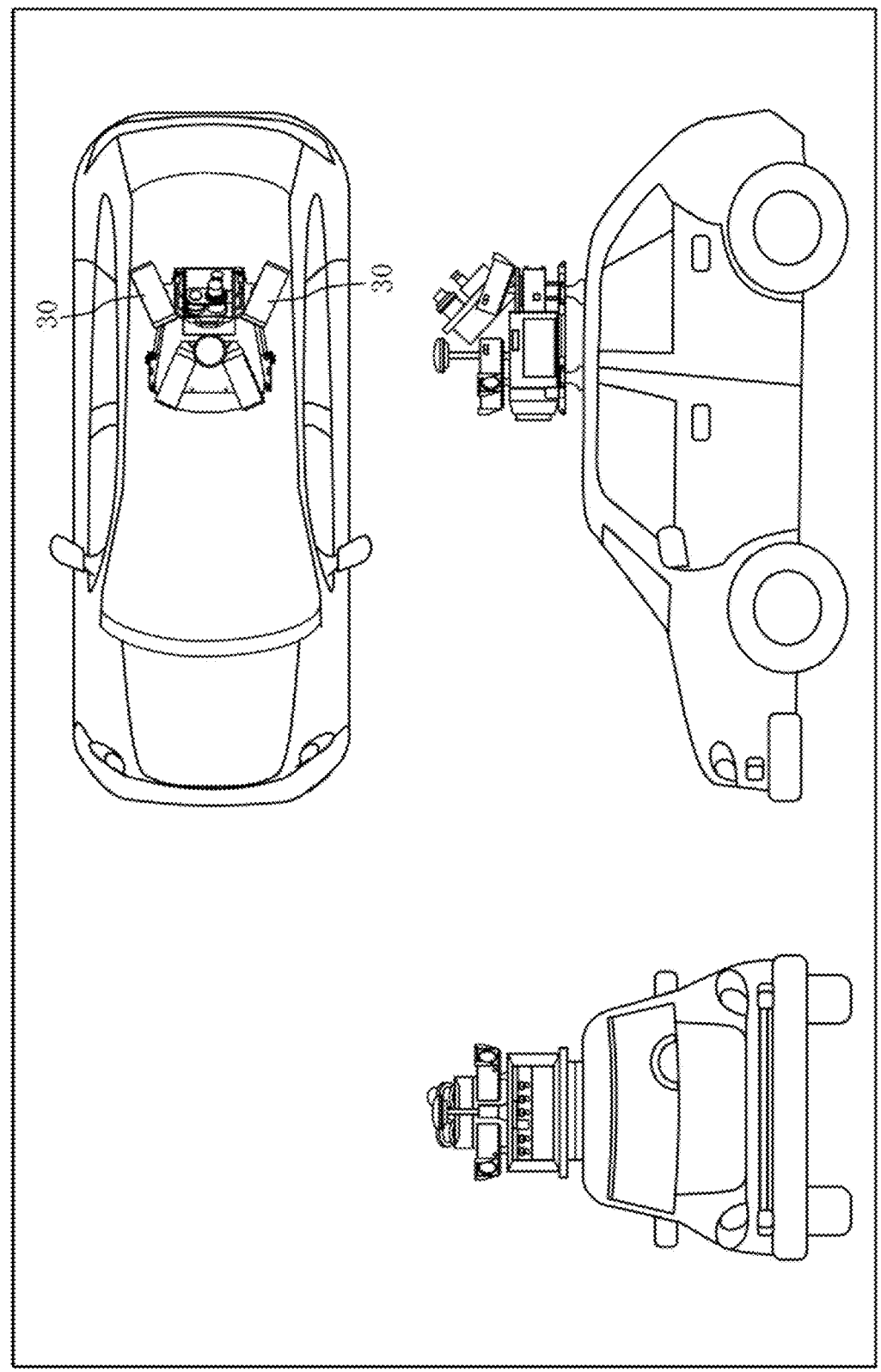
FIG. 22 is an explanatory drawing to a case wherein the imaging device 30 takes an image of a road surface 32 according to the filth embodiment.
Figure 23:
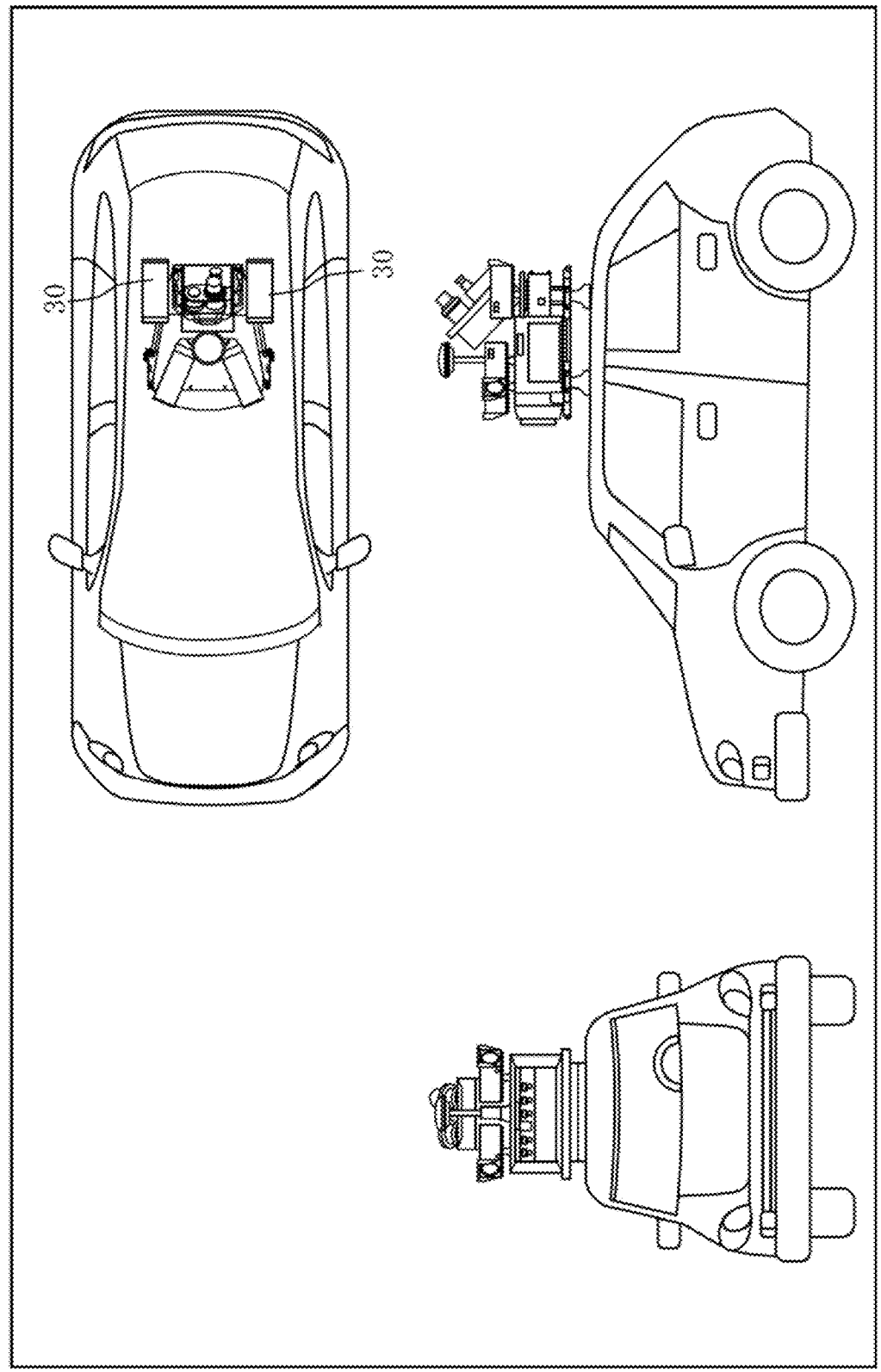
FIG. 23 is an explanatory drawing in a case wherein the imaging device 30 takes an image of a back side according to the fifth embodiment.

As illustrated in FIG. 21, it is possible for the imaging device 30 to move in an imaging direction in a vertical direction and a horizontal direction, Therefore, as illustrated in FIG. 22, two cameras are directed obliquely downward, and each of two cameras is directed slightly outward so that it is possible to take an image of an entire road. In this manner, an image of the entire road surface 32 of the road is taken. Further, as illustrated in FIG. 23, two cameras are directed horizontally in this manner, it is possible to take an image of a back side of the vehicle 31.

As seen, since it is possible to shift an imaging direction in a vertical direction and a horizontal direction, it is possible to use the imaging device 30 not only for taking an image of the road surface 32 but also for taking an image of the circumference of the vehicle 31. Therefore, it is unnecessary to make the imaging device 30 be a dedicated device for imaging the road surface 32.

As described above, it is possible for the crack detection device 10 according to the present invention to suitably detect a crack on the road surface 32 by using image data acquired by taking an image of a road surface from an oblique direction with respect to the road surface. Therefore, it is unnecessary to perform orthophoto conversion on image data.

In order to convert image data acquired by taking an image from an angle into an ortho image, a complicated arithmetic operation is necessary. Further, it is necessary to use image data with a high resolution in detecting cracks. Therefore, in order to convert, a large amount of image data with a high resolution acquired by taking imaged of a road surface, a long processing time is required. However, by using the crack detection device 10 according to the present in it is possible to reduce the processing time for detecting cracks.

In the above, the embodiments and the variations of the present invention are described. Some of these embodiments and the variations may be combined and performed. Further, any one or some may be partially performed. The present invention is not limited to the embodiments and the variations as above, and various alterations can be applied as needed.

REFERENCE SIGNS LIST

10: crack detection device; 11: processor; 12: memory; 13: storage; 14: communication interface; 15: electronic circuit; 21: image acquisition unit; 22: image classification unit; 23: data output unit; 24: image display unit; 25: crack detection unit; 26: image extraction unit; 27: width set unit; 28: reference information display unit; 30: imaging device; 31: vehicle; 32: road surface; 33: parting line; 34: overlapping area; 35: line; 40: measurement unit; 41: part; 42: mounting plate

The invention claimed is:

1. A crack detection device comprising:
processing circuitry to:
acquire image data acquired by imaging a road surface from an oblique direction with respect to the road surface;
classify the acquired image data into an acceptable range with a resolution higher than a standard value, and an unacceptable range with a resolution equal to or less than the standard value; and
output acceptable data being image data of a part classified into the acceptable range, as data to detect a crack on the road surface,
wherein the image data is acquired by an imaging device that is mounted on a moving object, and
wherein the processing circuitry is configured to set a determination width being a lower limit value of a crack width to be detected in accordance with a shutter speed of the imaging device and a moving speed of the moving object.

2. The crack detection device as defined in claim 1, wherein the processing circuitry classifies a range wherein a vehicle appears in the image data into the unacceptable range.

3. The crack detection device as defined in claim 1,
wherein the image data is repeatedly acquired by the imaging device while the moving object is moving,
wherein the processing circuitry extracts effective data by retaining acceptable data with a high resolution with respect to an overlapping area that overlaps with other acceptable data, from acceptable data acquired from each of a plurality of pieces of image data repeatedly acquired, and
wherein the processing circuitry outputs the extracted effective data as data to detect the crack on the road surface.

4. The crack detection device as defined in claim 3, wherein the processing circuitry displays the output data on a display device.

5. The crack detection device as defined in claim 4, wherein the processing circuitry displays at a time the effective data extracted from each of the plurality of pieces of image data, by arranging the effective data according to an acquisition order of the plurality of pieces of image data.

6. The crack detection device as defined in claim 1, wherein the processing circuitry sets the determination width in accordance with a position in the image data.

7. The crack detection device as defined in claim 1, wherein the processing circuitry displays reference information to indicate the set determination width.

8. The crack detection device as defined in claim 1, wherein the processing circuitry detects the crack wider than the determination width, from the output data.

9. The crack detection device as defined in claim 1, wherein the image data is acquired by imaging only a partial area, whereby data with a resolution higher than the standard value is acquired, whose distance from the imaging device is within a standard range, among an imaging area which can be imaged by the imaging device.

10. A crack detection method comprising:
acquiring image data acquired by imaging a road surface from an oblique direction with respect to the road surface;
classifying the image data into an acceptable range with a resolution higher than a standard value, and an unacceptable range with a resolution equal to or less than the standard value; and
outputting acceptable data being image data of a part classified into the acceptable range, as data to detect a crack on the road surface,
wherein the image data is acquired by an imaging device that is mounted on a moving object, and
wherein the method includes setting a determination width being a lower limit value of a crack width to be detected in accordance with a shutter speed of the imaging device and a moving speed of the moving object.

11. A non-transitory computer readable medium storing a crack detection program to make a computer function as a crack detection device, the crack detection program performing:
an image acquisition process to acquire image data acquired by imaging a road surface from an oblique direction with respect to the road surface;
an image classification process to classify the image data acquired by the image acquisition process into an acceptable range with a resolution higher than a standard value, and an unacceptable range with a resolution equal to or less than the standard value; and
a data output process to output acceptable data being image data of a part classified into the acceptable range by the image classification process, as data to detect a crack on the road surface,
wherein the image data is acquired by an imaging device that is mounted on a moving object, and
wherein the crack detection program performed a setting process to set a determination width being a lower limit value of a crack width to be detected in accordance with a shutter speed of the imaging device and a moving speed of the moving object.

12. The crack detection device as defined in claim 1, wherein the processing circuitry automatically detects the crack on the road surface using the output acceptable data.

13. The crack detection device as defined in claim 1,
wherein the crack detection device is part of a crack detection system, and
wherein the crack detection system includes the imaging device.

\* \* \* \* \*